United States Patent
Tsubouchi et al.

[19]

[11] Patent Number: 5,890,775
[45] Date of Patent: Apr. 6, 1999

[54] VACUUM SERVO UNIT FOR A VEHICLE BRAKING SYSTEM

[75] Inventors: Kaoru Tsubouchi, Toyota; Yoichi Terasaki, Kariya; Akihiko Miwa, Anjo, all of Japan

[73] Assignee: Aisin Seiki Kabushiki Kaisha, Kariya, Japan

[21] Appl. No.: 705,417

[22] Filed: Aug. 29, 1996

[30] Foreign Application Priority Data

| Aug. 29, 1995 | [JP] | Japan | 7-220574 |
| Aug. 29, 1995 | [JP] | Japan | 7-220575 |
| Feb. 26, 1996 | [JP] | Japan | 8-038440 |
| Feb. 26, 1996 | [JP] | Japan | 8-038441 |

[51] Int. Cl.$^6$ .................................................. B60T 8/44
[52] U.S. Cl. ...................... 303/114.3; 188/356; 91/376 R
[58] Field of Search .............................. 303/113.3, 114.3, 303/115.3; 188/356, 357; 60/545, 547.1; 91/376 R

[56] References Cited

U.S. PATENT DOCUMENTS

| 4,610,485 | 9/1986 | Watanabe | 303/114.3 |
| 4,630,706 | 12/1986 | Takayama et al. | 180/273 |
| 4,875,740 | 10/1989 | Takayama | 303/50 |
| 5,176,065 | 1/1993 | Castel et al. | 91/376 R |
| 5,178,441 | 1/1993 | Heibel et al. | 303/114.3 |
| 5,181,769 | 1/1993 | Schiel et al. | 303/114.3 |
| 5,275,265 | 1/1994 | Castel | 188/356 |
| 5,350,225 | 9/1994 | Steiner et al. | 303/113.4 |
| 5,454,279 | 10/1995 | Castel et al. | 303/114.3 X |
| 5,704,455 | 1/1998 | Watanabe | 188/356 |

FOREIGN PATENT DOCUMENTS

| 2 696 399 | 4/1994 | France . |
| 37 05 333 | 8/1987 | Germany . |
| 39 16 640 | 12/1990 | Germany . |
| 39 43 002 | 7/1991 | Germany . |
| 4-2455 | 1/1992 | Japan . |
| 4-5577 | 1/1992 | Japan . |
| 5-24533 | 2/1993 | Japan . |
| 5-201316 | 8/1993 | Japan . |
| 6-179361 | 6/1994 | Japan . |
| 9-503722 | 4/1997 | Japan . |
| 95/11151 | 4/1995 | WIPO . |

*Primary Examiner*—Peter M. Poon
*Attorney, Agent, or Firm*—Burns, Doane, Swecker & Mathis, LLP

[57] ABSTRACT

A vacuum servo unit includes a partition member having an outer periphery that engages the movable wall member in an air tight manner. A receiving chamber is defined between the partition member and the movable wall member, and the receiving chamber is adapted to be communicated with the atmosphere. A passage that introduces atmospheric air into the receiving chamber is engaged in an air tight manner with the partition member and extends through the constant pressure chamber. A change member in the form of a solenoid valve selectively communicates the receiving chamber with the constant pressure chamber or with the atmosphere. Accordingly, the servo efficiency of the vacuum servo unit is increased. In addition, the unit can be operated automatically by supplying electric power to thereby increase brake force so that the brake feeling is advanced.

11 Claims, 17 Drawing Sheets

Fig. 16
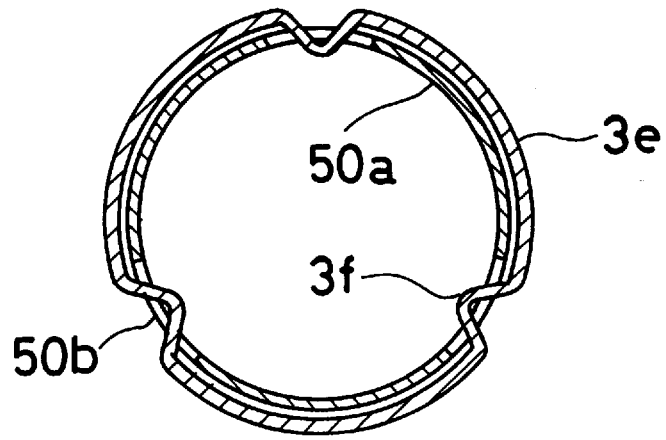
Fig. 17
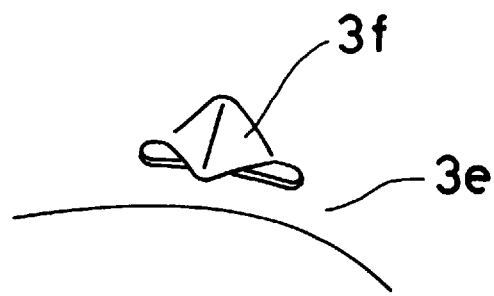
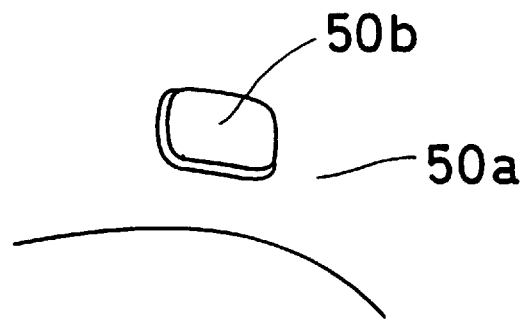

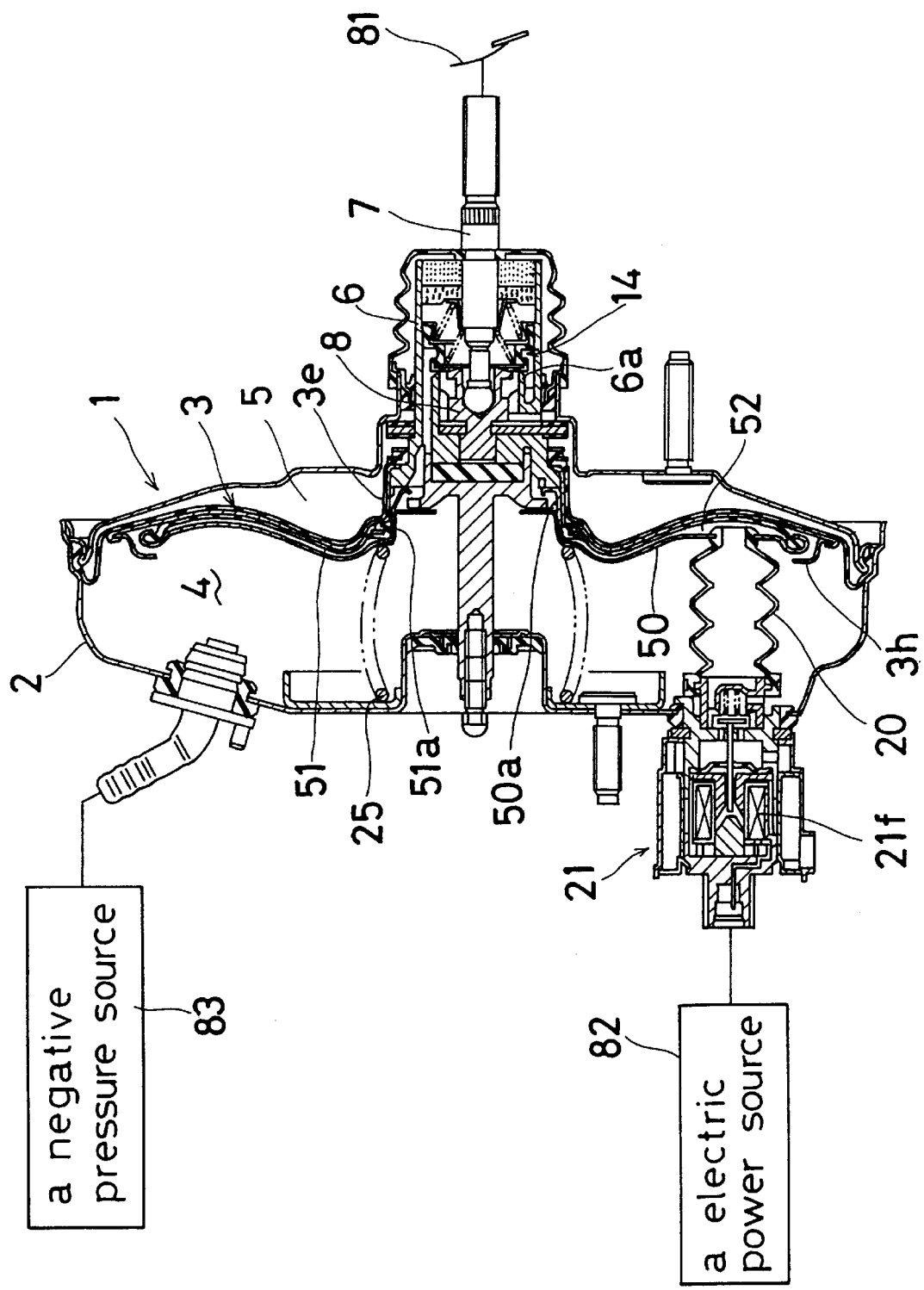

VACUUM SERVO UNIT FOR A VEHICLE BRAKING SYSTEM

FIELD OF THE INVENTION

The present invention relates to a vacuum servo unit for a vehicle braking system, and more particularly to a vacuum booster for a vehicle braking system unit that is automatically operated by electric power to increase the brake force.

BACKGROUND OF THE INVENTION

A vacuum servo-unit for reducing the operating input force to be applied when the operation of the vehicle braking system is initiated has been generally used for some time. This vacuum servo unit typically includes a constant pressure chamber to which the negative pressure is constantly supplied, and a variable pressure chamber. In one state, the variable pressure chamber is communicated with the atmosphere and is cut off from the constant pressure chamber, and in another state the variable pressure chamber is communicated with the constant pressure chamber and is cut off from the atmosphere. A vacuum valve member intermittently establishes communication between the constant pressure chamber and the variable pressure chamber, and an air valve member intermittently establishes communication between the atmosphere and the variable pressure chamber. The vacuum valve member and the air valve member are respectively opened and shut by the operation of the brake operation member, and a pressure differential according to the operation force supplied to the brake operation member is established between the constant pressure chamber and the variable pressure chamber. Thus, the vacuum servo unit generates an amplified brake force according to the operation force supplied to the brake operation member.

In recent years, a vacuum servo unit employing a solenoid valve operated by electricity has been known. This type of vacuum servo unit is disclosed in Japanese Laid-Open Publication No. 5-24533. In this vacuum servo unit, when the driver doesn't actuate the brake operation member, the solenoid valve is operated so that the variable pressure chamber is communicated with the atmosphere by the operation of the solenoid valve. As a result, a big pressure differential is generated between the variable pressure chamber and the constant pressure chamber and so a big braking force is generated.

However, the foregoing vacuum servo unit has a passage at a center portion thereof through which flows atmospheric air. This decreases the area receiving the pressure differential of the movable member which generates the servo force. This results in reduced servo efficiency.

Additionally, the inhalation port of the passage through which flows the atmospheric air is forced to be provided on the limited portion located at the front of the vacuum servo unit. This restricts the placement of the vacuum servo unit when the vacuum servo unit is installed in the vehicle.

When an urgent state is detected from, for example, the operation speed of the brake operation member so that the vacuum servo unit generates a braking force that exceeds the normal operation braking force, atmosphere is introduced into the variable pressure chamber regardless of the operation of the brake operation member. Therefore, the vacuum servo unit must be provided with a detecting device for detecting a return operation of the brake operation member in case the brake force is released when the driver applies a return operation of the brake operation member.

In an urgent condition, a considerable amount of atmospheric air must be introduced into the variable pressure chamber in order that the maximum servo force is generated. Thus, it takes a relatively long time to increase the brake force.

SUMMARY OF THE INVENTION

Accordingly, a need exists for a vacuum servo unit that is able to overcome the aforementioned drawbacks associated with the conventional vacuum servo unit. That is, a need exists for a vacuum servo unit that generates a bigger servo force, is capable of responding to the amount of operation of the brake operation member, is simple in structure and compact, and is automatically operated by the supply of electric power.

In light of the foregoing, one aspect of the present invention involves a vacuum servo unit for a vehicle braking system that includes a housing in which is defined a pressure chamber, a movable wall member provided in the housing to divide the pressure chamber into a constant pressure chamber adapted to communicate with a negative pressure source and a variable pressure chamber adapted to selectively communicate with the atmosphere or with the negative pressure source, and a movable power piston integrally connected with the movable wall member. The movable power piston has a connect path for communicating the constant pressure chamber with the variable pressure chamber. An input member is provided in the movable power piston and is axially movable in response to brake actuation. An output member outputs a propulsion force in response to the movement of the movable power piston. A control member selectively communicates the variable pressure chamber with the negative pressure source or with the atmosphere according to the movement of the input member against the movable power piston. The outer peripheral portion of a partition member engages the movable wall member in an air tight manner. A receiving chamber into which atmospheric air is introduced is formed between the partition member and the movable wall member. A passage which introduces atmospheric air into the chamber is engaged in an air tight manner with the partition member and extends through the constant pressure chamber. A change member in the form of a solenoid valve selectively communicates the receiving chamber with the constant pressure chamber or with the atmosphere.

When the change member is operated, atmospheric air is introduced into the chamber or with the variable pressure chamber through the chamber. Thus, a brake force is generated whether the brake operation member is actuated or not. The vacuum servo unit also possesses increased servo efficiency and can be operated automatically by the supply of electric power to increase the brake force so that the brake feeling is advanced.

According to another aspect of the invention, a vacuum servo unit for a vehicle braking system includes a housing in which is defined a pressure chamber, a movable wall member positioned in the housing for dividing the pressure chamber into a constant pressure chamber for communicating with a negative pressure source and a variable pressure chamber for selectively communicating with the atmosphere and with the negative pressure source, and a movable power piston connected with the movable wall member. The movable power piston is provided with a connect path which communicates the constant pressure chamber with the variable pressure chamber. An input member is positioned in the movable power piston and an output member outputs a propulsion force from the movable power piston in response to movement of the movable wall member. A control member selectively communicates the variable pressure chamber with the negative pressure source or the atmosphere according to movement of the input member against the movable power piston. A supplementary movable wall member is provided in the constant pressure chamber for engaging the output member during movement of the supplementary movable wall member and a seal member is in air tight engagement with the supplementary movable wall member to form a supplementary variable pressure chamber between the supplementary movable wall member and the seal member. A change member is also provided for selectively communicating the supplementary variable pressure chamber with the constant pressure chamber or with the atmosphere.

BRIEF DESCRIPTION OF THE DRAWING FIGURES

The foregoing and other features of the present invention will become more readily apparent from the following description considered with reference to the accompanying drawing figures in which like elements are designated by like reference numerals and wherein:

FIG. 16 is a partly enlarged cross-sectional view of a vacuum servo unit according to a tenth embodiment of the present invention.

FIG. 17 is a perspective view of a portion of the vacuum servo unit shown in FIG. 16 illustrating;

FIG. 20 is a cross-sectional view of a vacuum servo unit according to a twelfth embodiment of the present invention;

DETAILED DESCRIPTION OF THE PREFERRED EMBODIMENTS

Figure 1:
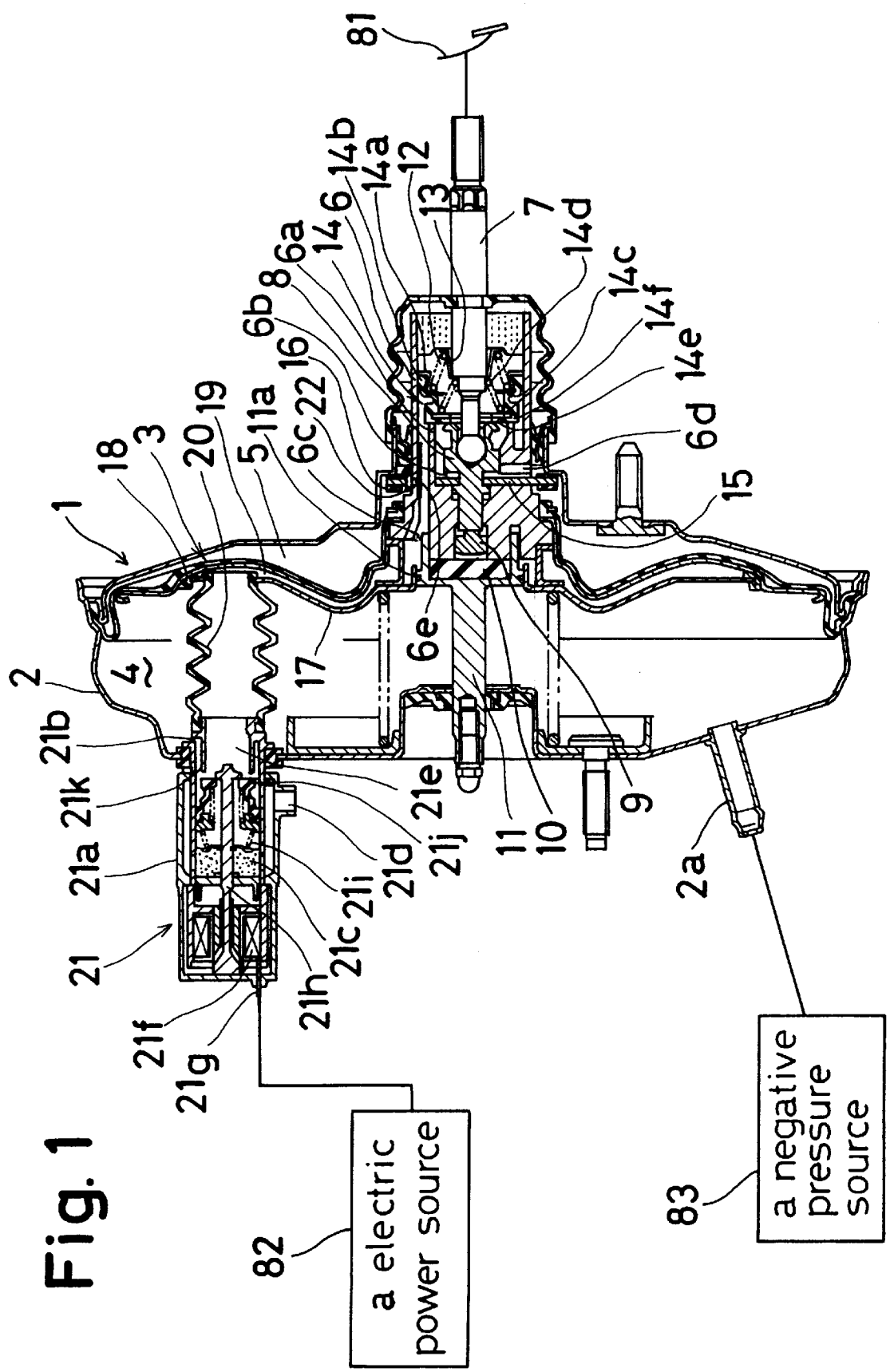
FIG. 1 is a cross-sectional view of a vacuum servo unit according to a first embodiment of the present invention.

With reference initially to FIG. 1, which illustrates a first embodiment of the present invention, the automatically operable vacuum servo unit 1 has a housing 2 that defines a pressure chamber. The outer peripheral portion of a movable wall member 3 is fixed in an air tight manner to the inside of the housing 2 and is movable in an axial direction. The pressure chamber in the housing 2 is divided in an air tight manner into a constant negative pressure chamber 4 and a variable pressure chamber 5 by means of the movable wall member 3. The constant pressure chamber 4 is adapted to communicate with a negative pressure source 83, such as the intake manifold of an internal combustion engine, through an inlet 2a.

A movable power piston 6 made of resin material is positioned in the housing 2 from the rear portion of the housing 2. The inner peripheral portion of the movable wall member 3 is connected in an air tight manner to the power piston 6.

An input rod 7 whose right end portion as seen in FIG. 1 is connected with a brake operation member (e.g., a brake pedal 81) is disposed in the power piston 6. The input rod 7 is connected with a first input member 8 so that the two are capable of moving together unitarily as one body.

A second input member 9 contacts the first input member 8. The first input member 8 and the second input member 9 play a roll in transmitting the brake operation force received from the input rod 7 to a reaction disc 10. An output rod 11 which contacts the reaction disc 10 moves by receiving the brake operation force through the reaction disc 10 to operate a master cylinder piston (not shown).

A spring retainer 13 that receives a return spring 12 is fixed on the input rod 7. A first retainer 14a that forms a valve member or control member 14 is fixed in the power piston 6 receiving the resilience from the input rod 7 through the spring retainer 13 and the return spring 12. A seal member 14b is also positioned within the power piston 6. The inner peripheral portion of the right end part of a seal member 14b is in engagement with the first retainer 14a. The outer peripheral portion of the right end part of the seal member 14b forms a seal with the inner peripheral surface of the power piston 6. The left end part of the seal member 14b is glued to a second retainer 14c. A valve spring 14d is provided between the input rod 7 and the second retainer 14c. The left end part of the seal member 14b is formed with an air valve portion 14e for contacting the right end portion of the first input member 8 and a vacuum valve portion 14f for contacting the valve seat 6a of the power piston 6.

By virtue of the aforementioned construction, the air valve portion 14e is in engagement with the first input member 8 in the non-operation state of the input rod 7. In the operation state of the input rod 7, the vacuum valve portion 14f engages the valve seat 6a formed on the power piston 6.

A stopper member 15 is inserted into a stopper groove 6b, and the stopper member 15 contacts the housing 2 through a damper member 16. Moreover, the power piston 6 has a first connect path 6c and a second connect path 6d to communicate the constant pressure chamber 4 with the variable pressure chamber 5 when the vacuum valve portion 14f is out of engagement with the valve seat 6a of the power piston 6.

A partition member 17 is provided in the constant pressure chamber 4 and has an inner peripheral portion that is in air tight engagement with the output rod 11 through an O-ring 11a. The outer peripheral portion of the partition member 17 is in air tight engagement with the variable wall member 3 by way of a first seal member 18. As a result, an atmosphere introduction chamber 19 is formed between the partition member 17 and the variable wall member 3.

An atmosphere introduction passage 20 that can expand and contract is provided in the constant pressure chamber 4. One end portion of the atmosphere introduction passage 20 is connected in an air tight manner with the partition member 17 and the other end portion communicates with a solenoid valve 21 that is in air tight engagement with the front face of the housing 2. As can be seen, the atmosphere introduction passage 20 extends through the constant pressure chamber 4 and is oriented generally parallel to the axis of the power piston 6.

The solenoid valve 21 includes a valve housing 21a that is provided with a constant pressure port 21b that communicates with the constant pressure chamber 4, an atmosphere port 21d that communicates with a cleaner member 21c, and a variable pressure port 21e that communicates with the atmosphere introduction passage 20. The solenoid 21f is connected with an electric power source 82 of the vehicle by a cord 21g and is supplied with electric power from the electric power source 82 through operation of a controller (not specifically shown).

A plunger 21h is disposed in the solenoid 21f and is biased towards the left as seen in FIG. 1 by a spring 21i to contact an atmosphere valve 21j. In this condition, because the atmosphere valve 21j is out of engagement with a constant pressure valve 21k, the atmosphere introduction chamber 19 communicates with the constant pressure chamber 4 through the inside of the atmosphere introduction passage 20, the variable pressure port 21e, and the constant pressure port 21b.

A one way valve 22, which permits atmospheric air flow in the direction from the first connect path 6c to the variable pressure chamber 5, and a hole 6e set up in the radial direction in the power piston 6 are provided between the first connect path 6c and the variable pressure chamber 5 to secure communication between the atmosphere introduction chamber 19 and the variable pressure chamber 5 when the vacuum valve portion 14f is in engagement with the valve seat 6a of the power piston 6.

When the solenoid 21f is supplied with electric power from the electric power source 82 by the controller (not specifically shown), the solenoid 21f biases the plunger 21h towards the right in FIG. 1 so that the atmosphere valve 21j engages the constant pressure valve seat 21k and the atmosphere valve 21j is out of engagement with the plunger 21h. Therefore, atmospheric air is introduced into the atmosphere introduction chamber 19 through the inside of the atmosphere introduction passage 20, the variable pressure port 21e, the air cleaner member 21c, and the atmosphere pressure port 21d.

The operation of the vacuum servo unit 1 is as follows. In the situation where the brake operation member 81 is not operated by the driver, i.e., in the state shown in FIG. 1, the air valve portion 14e of the valve member 14 is in engagement with the first input member 8, and the vacuum valve portion 14f is out of engagement with the valve seat 6a of the power piston 6. Thus, the variable pressure chamber 5 is in communication with the vacuum power source 83 (e.g., the intake manifold of an internal combustion engine) through the constant pressure chamber 4.

When the brake operation member 81 of the vehicle is actuated by the driver, the input rod 7 connected with the brake pedal 81 receives the brake operation force and moves towards the left as seen in FIG. 1. The first input member 8 which is fixed to the input rod 7 moves integrally with the input rod 7 towards the left in FIG. 1.

The air valve portion 14e and the vacuum valve portion 14f also are moved towards the left by the biasing force of the valve spring 14d with the first input member 8 according to the movement of the first input member 8. The vacuum valve portion 14f then contacts the valve seat 6a of the power piston 6 and this cuts off communication between the variable pressure chamber 5 and the constant pressure chamber 4. Therefore, communication between the variable pressure chamber 5 and the vacuum source 83 is cut off.

As the first input member 8 moves further towards the left in FIG. 1, the engagement between the air valve portion 14e and the first input member 8 ceases. Thus, the variable pressure chamber 5 communicates with the atmosphere and a pressure differential is generated between the constant pressure chamber 4 and the variable pressure chamber 5 by the inflow of atmospheric air into the variable pressure chamber 5. The movable wall 3 receives the load force created by the pressure differential and the power piston 6 connected with the movable wall 3 applies the amplified brake force to the output rod 11 through the reaction disc 10. After this, either the air valve portion 14e and the first input member 8 or the vacuum valve portion 14f and the valve seat 6a are in the engagement state by the reaction force that the input rod 7 receives through the second input member 9 and the first input member 8. The servo force of the vacuum servo unit 1 is controlled according to the brake operation force applied to the input rod 7 by the driver.

The reaction force according to the brake force generated by the power piston 6 and the brake operation force generated by the operation of the brake pedal 81 and transmitted to the second input member 9 are applied to both sides of the reaction disc 10 respectively, and the reaction force and the brake operation force are balanced.

In this condition, because the solenoid 21f is in the non-operating condition, the atmosphere introduction chamber 19 communicates with the constant pressure chamber 4.

When an urgent brake operation is needed, such as when an obstacle is detected by a picture disposal of a CCD camera or a distance measuring sensor, the solenoid 21f is supplied with electric power from the electric power source 82 apart from the brake operation by the driver. The solenoid 21f supplied with the electric power generates electromagnetic power to move the plunger 21h towards the right in FIG. 1 against the biasing force of the spring 21i.

When the vacuum servo unit is in the non-operating state such that the input rod 7 is not being operated and the vacuum valve portion 14f is out of engagement with the vacuum valve seat 6a, atmospheric air is introduced into the atmosphere introduction chamber 19 according to the movement of the plunger 21h. The atmospheric air is introduced into the variable pressure chamber 5 through the first connect path 6c, the clearance between the vacuum valve portion 14f and the valve seat 6a of the power piston 6, and the second connect path 6d. Large quantities of atmospheric air are thus introduced into the variable pressure chamber 5, the movable wall 3 is operated towards the left in FIG. 1, and a large brake force is produced.

In the condition in which the vacuum servo unit 1 is in the operating state by the operation of the input rod 7, and the reaction force from the output rod 11 and the input force from the power piston 6 are being balanced, the vacuum valve portion 14f is in engagement with the valve seat 6a and communication between the first connect path 6c and the second connect path 6d is cut off. In this condition, atmospheric air is introduced into the variable pressure chamber 5 through the first connect path 6c and the hole 6e provided in the power piston 6 opening to the one way valve 22.

In accordance with the vacuum servo unit 1 constructed in the manner described above, the vacuum servo unit possesses increased efficiency and can be operated automatically by the supply of electric power to increase the brake force so that the brake feeling is advanced.

In the vacuum servo unit 1 of the present invention, since the atmosphere introduction passage 20 that communicates with the atmosphere introduction chamber 19 has a relatively small cross section in the radial direction, the servo efficiency of the vacuum servo unit 1 is not decreased.

Additionally, since the partition member 17 is provided in front of the movable wall member 3 and the atmosphere introduction passage 20 is provided in front of the partition member 17 towards the front portion of the housing 2 (i.e., the partition member 17 is located on the constant pressure chamber side of the movable wall member 3), the atmosphere introduction port communicating with the outside of the vacuum servo unit can be located at any one of a number of different locations between the partition member 17 and the housing 2. Thus, the vacuum servo unit 1 is advantageous in that the solenoid valve 21 can be directly connected the housing 2 in a manner that reduces the possibility of creating a potential obstacle on assembling the vacuum servo unit to the vehicle.

The partition member 17 and the movable wall member 3 engage each other by a relatively simple structure involving the first seal member 18 in order to maintain a high degree of air-tightness. The area on the partition member 17 where the atmosphere introduction passage 20 can be installed is made larger so that the degree of freedom available during installation of the atmosphere introduction passage 20 on the partition member 17 is improved.

In the first embodiment mentioned above, the partition member 17 is engaged with the power piston 6 through the output member 11 and the reaction disk 10. However, the present invention is not limited to such a construction of the vacuum servo unit, and indeed can be applied to a vacuum servo unit in which the partition member is directly engaged with the power piston.

The atmosphere introduction passage 20 communicates with the variable pressure chamber 5 through the first connect path 6c and the second connect path 6d for communicating the constant pressure chamber 4 with the variable pressure chamber 5 when the solenoid valve 21 is operating. However, the composition consisting of the solenoid valve 21, the atmosphere introduction passage 20 and the atmosphere introduction chamber 19 can be applied to various constructions of the vacuum servo unit that are intended to increase other functional characteristics.

Figure 2:
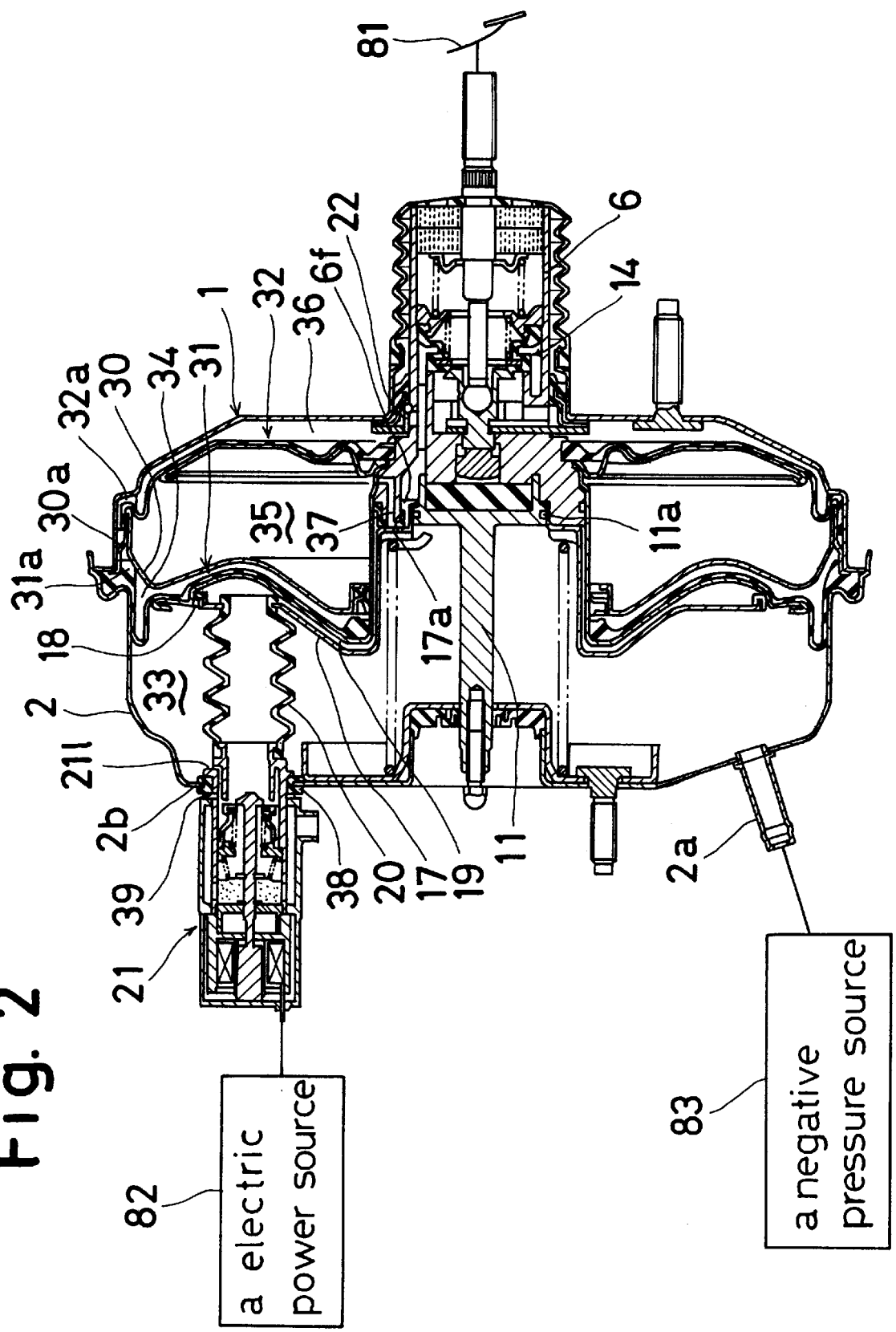
FIG. 2 is a cross-sectional view of a vacuum servo unit according to a second embodiment of the present invention.

FIG. 2 illustrates a second embodiment of the present invention. Elements associated with the embodiment of FIG. 2 that are the same as those described above in connection with the embodiment of FIG. 1 are identified with the same reference numerals as those used in FIG. 1. The following description focuses primarily on the differences in the second embodiment relative to the first embodiment.

Referring to FIG. 2, the vacuum servo unit according to the second embodiment of the present invention is depicted as being applied to a tandem-type vacuum servo unit. The automatically operable vacuum servo unit 1 has a housing 2 that defines a pressure chamber. The outer peripheral portion of a partition wall member 30 is fixed in an air tight manner to the inside of the housing 2. The outer peripheral portion of an axially movable front wall member 31 is fixed in an air tight manner to the inside of the housing 2. In addition, an axially movable rear wall member 32 substantially the same as the front movable wall member 31 is provided inside the housing.

The pressure chamber in the housing 2 is divided in an air tight manner into a front constant negative pressure chamber 33, a rear constant negative pressure chamber 35, a front variable pressure chamber 34, and a rear variable pressure chamber 36. The front constant negative pressure chamber 33 is defined between the front of the housing and the front movable wall member 31, the rear constant negative pressure chamber 35 is defined between the partition wall member 30 and the rear wall member 32, the front variable pressure chamber 34 is defined between the front movable wall member 31 and the partition wall member 30, and the rear variable pressure chamber 36 is defined between the rear portion of the housing and the rear wall member 32. The front constant pressure chamber 33 and the rear constant pressure chamber 35 are adapted to communicate, through an inlet 2a, with a vacuum or negative pressure source 83 which can be in the form of the intake manifold of an internal combustion engine.

The partition member 17 is provided in the front constant pressure chamber 33 and has and inner peripheral portion that is in air tight engagement with the output rod 11 through an O-ring 11a. The outer peripheral portion of the partition member 17 is in air tight engagement with the front variable wall member 31 by way of a first seal member 18, and an atmosphere introduction chamber 19 is formed between the partition member 17 and the front movable wall member 31.

The partition wall member 30, the front movable wall member 31, and the rear movable wall member 32 are provided with respective holes 30a, 31a, 32a at their respective outer peripheral portions. The front variable pressure chamber 34 and the rear variable pressure chamber 36 communicate with each other through the holes 30a, 31a, 32a.

The front constant pressure chamber 33 and the rear constant pressure chamber 35 are adapted to communicate with a vacuum source 83, such as the intake manifold of an internal combustion engine, through an inlet 2a. Thus, the front constant pressure chamber 33 and the rear constant pressure chamber 35 are constantly under the influence of negative pressure.

The power piston 6 has a connect path 6f for communicating the front constant pressure chamber 33 with the rear variable pressure chamber 36 and a vacuum path 37 that is provided in the connect path 6f for communicating the rear constant pressure chamber 35 with the front constant pressure chamber 34. The rear constant pressure chamber 35 communicates with the front constant pressure chamber 33 and a negative pressure source 83 through the vacuum path 37 and a hole 17a that is provided on the partition member 17 in order to face to the left open end portion of the vacuum path 37. Thus, the rear constant pressure chamber 35 is constantly under the influence of negative pressure. The vacuum path 37 and the partition member 17 are connected to each other in an air tight manner through a seal member.

An atmosphere introduction passage 20 that is adapted to expand and contract is provided in the front constant pressure chamber 33. One end portion of the atmosphere introduction passage 20 is connected in an air tight manner with the partition member 17 and the other end portion communicates with a solenoid valve 21 that is in air tight engagement with the front face of the housing 2. Thus, the atmosphere introduction passage 20 extends through the front constant pressure chamber 33 and in a direction generally parallel to the axis of the power piston 6.

A change member in the form of a solenoid valve 21 is disposed in an installing hole 2b for installing the solenoid valve 21 inside the housing 2 through a seal member 38. A support portion 211 provided on the solenoid valve 21 engages the inside of the housing 2 at the outer peripheral side of the hole 2b, and an engaging member in the form of a support ring 39 is installed elastically on the outer peripheral portion of the solenoid valve 21 so that the support ring 39 engages the outside of the housing 2 through the seal member 38. This causes the solenoid valve 21 to be engaged with the front of the housing 2.

The operation of the vacuum servo unit 1 in accordance with the second embodiment shown in FIG. 2 is substantially similar to the vacuum servo unit of the first embodiment and so a detailed explanation is omitted. In brief, the actuation of the valve member 14 cuts off communication between both constant pressure chambers 33, 35 and both variable pressure chambers 34, 36, and effects communication between the variable pressure chambers 34, 36 and the atmosphere. Thus, atmospheric air flows into the rear variable pressure chamber 36, and the atmospheric air introduced to the rear variable pressure chamber 36 flows into the front variable pressure chamber 34 through the outer peripheral portion of the rear variable pressure chamber 36, the hole 32a in the rear movable wall member 32, the hole 30a in the partition wall member 30, and the hole 31a in the front movable wall member 31. This generates a pressure differential between both constant pressure chambers 33, 35 and both variable pressure chambers 34, 36.

When the solenoid valve 21 is operated, atmospheric air is introduced into the atmosphere introduction chamber 19. The atmospheric air introduced into the atmosphere introduction chamber 19 flows in the connect path 6f in order to pass around the outer peripheral portion of the vacuum path 37 and flow into the rear variable pressure chamber 36 and the front variable pressure chamber 34. Additionally, in the condition in which the vacuum servo unit 1 is in the operating state and the reaction force from the output rod 11 and the input force from the power piston 6 are being balanced, the atmospheric air is introduced into the rear variable pressure chamber 36 by the operation of the one-way valve 22 in the same manner as in the first embodiment.

As mentioned above, one end portion of the atmosphere introduction passage 20 engages the partition member 17 while the opposite end portion engages the solenoid valve 21. The housing 2 has the installing hole 2b for installing the solenoid valve 21 and the solenoid valve 21 has a support portion 211 for engaging with the inside of the housing 2 along the periphery of the installing hole 2b. The support ring 39 is provided on the outer peripheral portion of the solenoid valve 21 that engages the outside of the housing 2 at the outer peripheral side of the installing hole 2b.

From an assembly standpoint, the one end portion of the atmosphere introduction passage 20 is first engaged with the partition member 17 and the other end portion is engaged with the solenoid valve 21. The solenoid valve 21 is then inserted into the installing hole 2b through the seal member 38 and the support portion 211 is engaged with the inside of the housing 2. The support ring 39 is then installed on the outer peripheral portion of the solenoid valve 21 to be engaged with the outside of the housing 2 through the seal member 38. This construction allows the housing 2 and the solenoid valve 21 to be engaged in an air tight manner with each other, yet allows the housing 2 and the solenoid valve 21 to be assembled to one another in a rather easy manner while the vacuum servo unit 1 is being assembled.

Also, the vacuum servo unit 1 represents an automatically operable tandem-type vacuum servo unit that possesses a high servo efficiency and improved brake feeling. Additional advantages and desirable attributes associated with this second embodiment of the present invention are similar to those described above in connection with the first embodiment.

In the second embodiment mentioned above, the annular support ring 38 is used as the engaging member, but it is understood that differently shaped and configured engaging elements.

Figure 3:
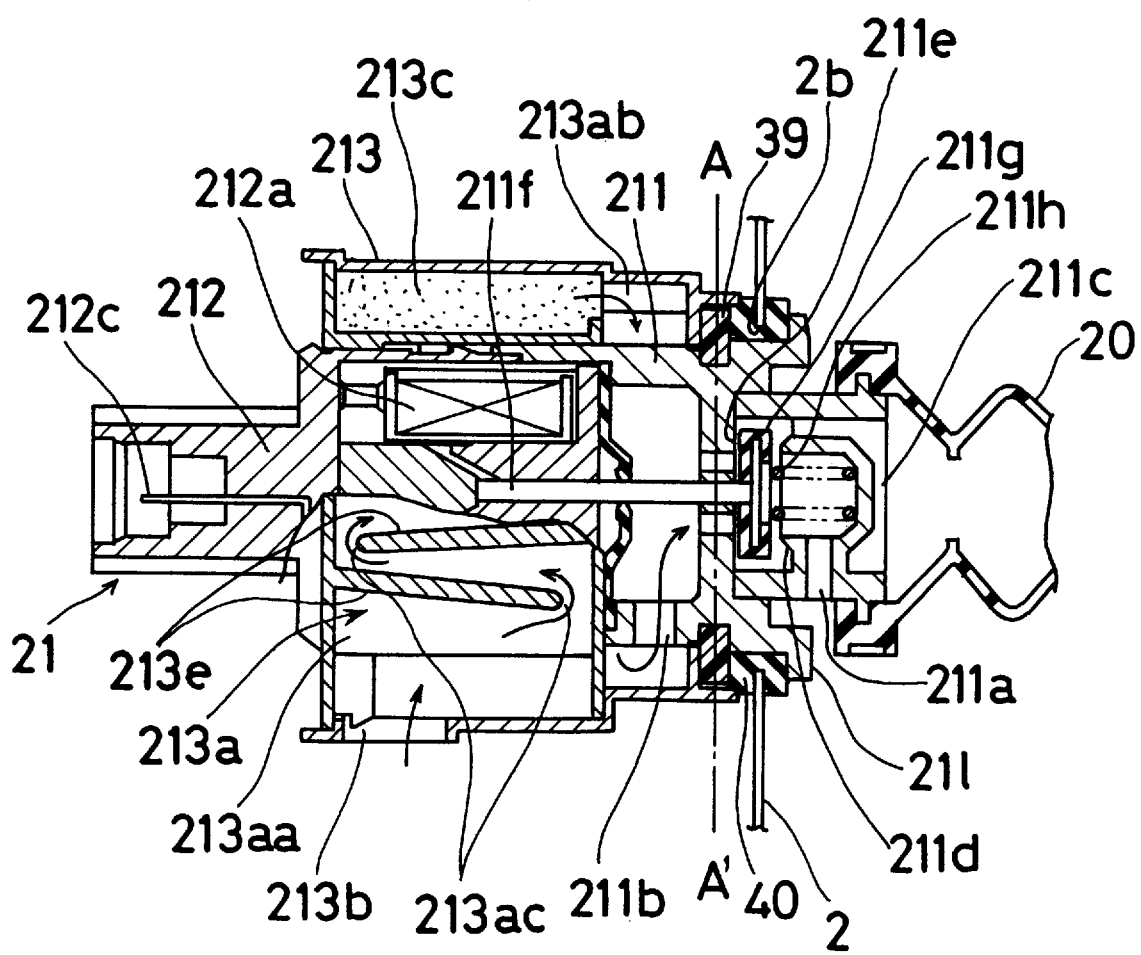
FIG. 3 is a cross-sectional view of a vacuum servo unit according to a third embodiment of the present invention.

FIGS. 3–6 illustrate a third embodiment of the present invention, wherein features similar to those in the first embodiment and the second embodiment are identified by the same reference numerals. In FIG. 3, the arrows show the stream of atmospheric air. The change member in the form of a solenoid valve 21 is located in an installing hole 2b of the housing 2 for allowing the solenoid valve 21 to be installed inside the housing 2 through a second seal member 40. The annular second seal member 40 engages the periphery of the installing hole 2b. A support portion 2111 provided on the solenoid valve 21 extends through the installing hole 2b and engages the inside of the housing 2 at the outer peripheral side of the installing hole 2b by way of the second seal member 40 and through a radially outwardly turned end of the support portion 211. An engaging member in the form of a support ring 39 is installed elastically in a groove in the outer peripheral portion of the solenoid valve 21 and engages the outside of the housing 2 through the second seal member 40. In this way, the solenoid valve 21 is mounted on the front of the housing 2.

The solenoid valve 21 is separated into a valve body portion 211 and a solenoid portion 212. The valve body portion 211 has a constant pressure port 211a, an atmosphere port 211b, a variable pressure port 211c, a constant pressure valve seat 211d, an atmosphere valve seat 211e, a plunger member 211f, and a valve body 211g secured to the end of the plunger member 211f. The solenoid portion 212 is provided with a solenoid 212a.

The solenoid valve 21 has a casing 213. The casing 213 forms an air path 213a for introducing atmospheric air that flows into the atmosphere introduction passage 20 through the solenoid valve 21 within itself. The air path 213a is directed around the solenoid valve 21.

The casing 213 has an inhalation port 213b forming an entrance of the air path 213a and this inhalation port 213b is located at the lower side of the casing 213 when the vacuum servo unit is installed in the vehicle. A filter 213c is positioned within the casing 213 at the upper side of the casing 213 when the vacuum servo unit is installed in the vehicle.

The air path 213a is defined by a first air path 213aa extending from the inhalation port 213b to the filter 213c and passing around the outer peripheral portion of the solenoid valve 21 towards the upper side as seen in FIG. 3. The air path 213a also includes a second air path 213ab that extends from the filter 213c to the atmosphere port 211b and passing around the outer peripheral portion of the solenoid valve 21 towards the lower side as seen in FIG. 3. Several wall members 213e of the casing (two of which are shown in FIG. 3) are provided in the first air path 213a so that the first air path 213a follows a labyrinth or serpentine like path having a plurality of curved portions 213ac. The wall members 213e are inclined towards the lower side as seen in FIG. 3 so that the inclined wall members 213e are directed towards the port 213b.

Figure 4:
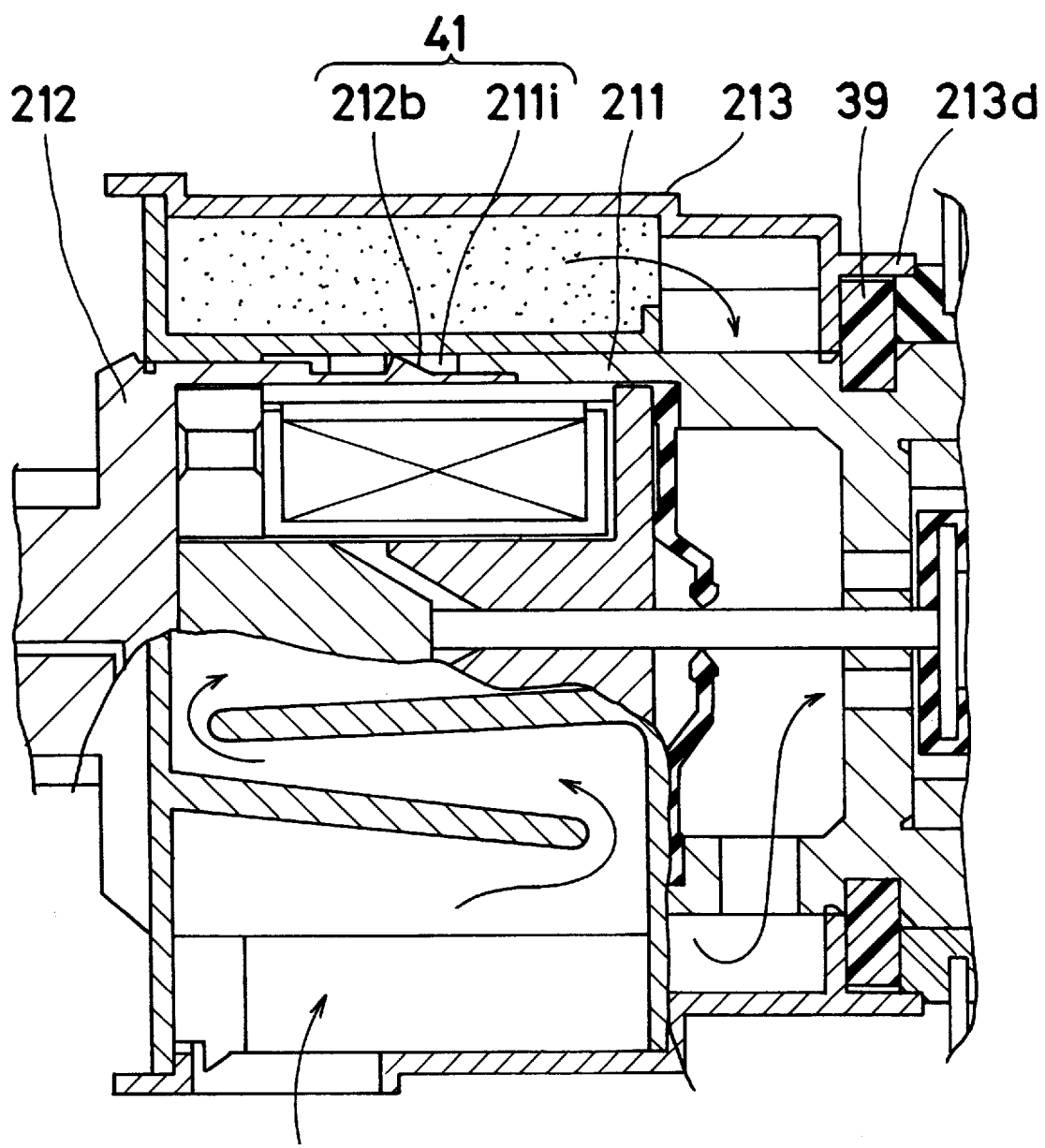
FIG. 4 is a partly enlarged cross-sectional view of a portion of the vacuum servo unit shown in FIG. 3.

As seen with reference to FIG. 4, the valve body portion 211 has connecting elements in the form of recess portions 211i. The solenoid portion 212 also has connecting elements in the form of projecting portions 212b for engaging the recess portions 211i. When the valve body portion 211 and the solenoid portion 212 are brought together, the left end portion of the valve body portion 211 is elastically deformed so that the left end portion of the valve body portion 211 climbs over the projecting portions 212b. The recess portions 211i are thus elastically engaged with the projecting portions 212b so that the valve body portion 211 and the solenoid portion 212 are integrally connected together. The connect portions 41 comprising the recess portions 211i and the projecting portions 212b are covered with the inside surface of the casing 213 so that the casing serves as a cover member.

Figure 5:
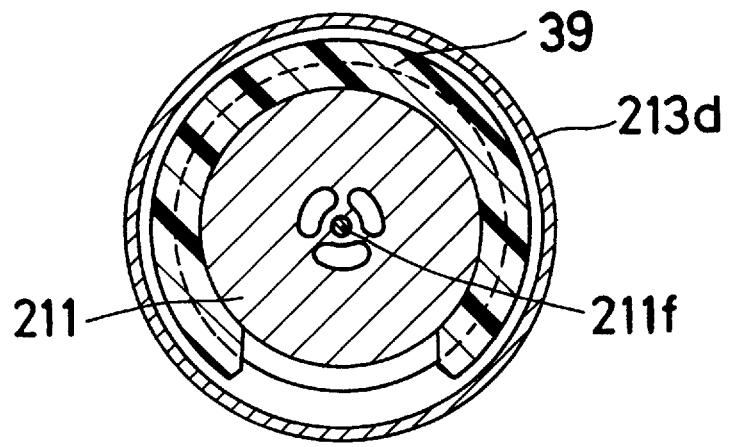
FIG. 5 is a cross-sectional view of the vacuum servo unit taken along the section line 5—5 in FIG. 3.
Figure 6:
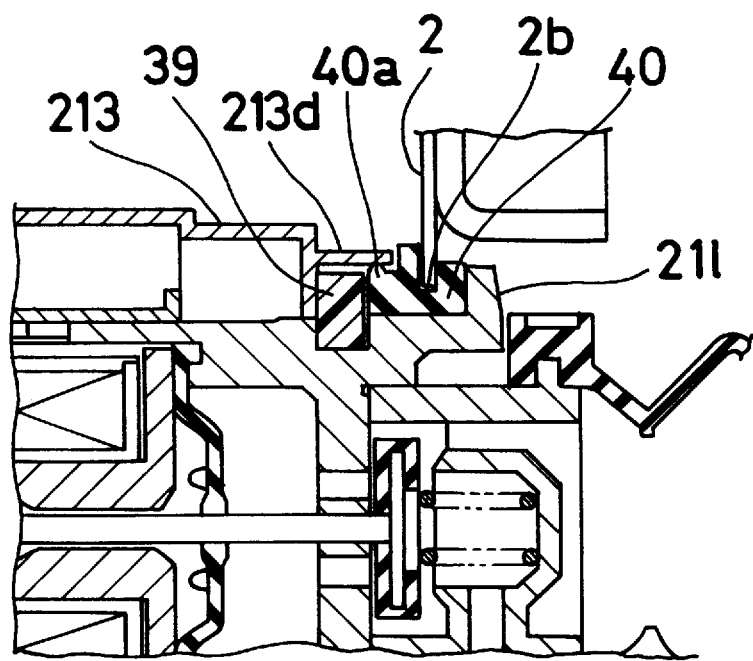
FIG. 6 is a partly enlarged cross-sectional view of a portion of the vacuum servo unit shown in FIG. 3.

As seen in FIGS. 4 and 5, the casing 213 has a cover portion 213d that covers the outer peripheral portion of the support ring 39. The left end part of the second seal member 40 is provided with a small protuberance or ridge as seen in FIG. 6. This ridge or protuberance provides an air tight seal with the cover portion 213d of the casing 213.

With reference once again to FIG. 3, the solenoid 212a is connected with an electric power source 82 of the vehicle by a terminal 212c and a cord (not specifically shown) and is supplied with electric power from the electric power source 82 through operation of a controller (not specifically shown). The plunger 21 If in the solenoid 212a is biased towards the left in FIG. 3 by a spring 211h so that the valve portion 211g contacts the atmosphere valve 211g. In this condition, because the atmosphere valve 211g is out of engagement with the constant pressure valve 211d, the atmosphere introduction chamber communicates with the constant pressure chamber through the atmosphere introduction passage 20, the variable pressure port 211c, and the constant pressure port 211a.

When the solenoid 212a is supplied with electric power from the electric power source 82 by the controller, the solenoid 212a biases the plunger 211f towards the right in FIG. 3 so that the valve 211g engages the constant pressure valve seat 211d and the valve 211g moves out of engagement with the atmosphere valve seat 211e. Therefore, atmospheric air is introduced into the atmosphere introduction chamber through the atmosphere introduction passage 20, the variable pressure port 211c, the atmosphere pressure port 211b, the air path 213a including the filter 213c, and the atmosphere inhalation port 213b.

As mentioned above, in the vacuum servo unit, the solenoid valve 21 is provided with the cover portion 213b so that the support ring 39 is prevented from coming off the solenoid valve 21. Therefore, the connection between the solenoid valve 21 and the housing 2 is strong.

Also, the solenoid valve 21 is provided with the casing 213 forming the air path 213a that introduces atmospheric air into the atmosphere introduction passage 20 through the solenoid valve 21 and around the outer peripheral portion of the solenoid valve 21. The casing 213 is also constructed so that the inhalation port 213b is located at the lower side while the filter 213c is disposed at the upper side. Thus, rainwater and other potential contaminants are prevented from infiltrating the solenoid valve 21 from the atmosphere inhalation port 213b, the capacity of the filter 213c is fully secured, and the solenoid valve 21 is made rather compact.

As mentioned above, the casing 213 is specifically constructed to provide an air path 213a having a lot of curved portions, i.e., the first air path 213aa defines a labyrinth or serpentine like path, and so the length of the air path 213a is extended. This extended path length for the air flow means that dust, water, and other elements in the atmosphere are more likely to adhere to the wall member 213e so that they can be removed. Also, since the wall member 213e is inclined towards the lower side in FIG. 3, any water adhering to the wall member 213e moves by gravitation towards the lower side along the wall member 213 and flows out to the outside of the solenoid valve 21 by way of the inhalation port 213.

In addition, since the second seal member 40 is provided for sealing the end portion of the housing side of the casing 213, i.e., the cover portion 213d, atmospheric air and water are prevented from entering the casing 213 from the end portion of the housing side of the casing 213. Thus, the unit is not susceptible to inadvertent and undesirable damage.

As mentioned above, the solenoid valve 21 is adapted to be connected to the atmosphere introduction passage 20. Also, the solenoid valve 21 is divided into the valve body portion 211 having valve seats 211d, 211e and a plunger 211f, and the solenoid portion 212 having the solenoid 212a. Further, the valve body portion 211 and the solenoid portion 212 are capable of being elastically combined or connected to one another. This means that after the valve body portion 211 is installed with the housing 2, the solenoid portion 212 can be elastically installed on the valve body portion 211. Thus, the assembly of the solenoid valve 21 can be divided into the mechanical assembly and the electrical assembly. Further, the casing 213 covers the connect portion 41 between the valve body portion 211 and the solenoid portion 212d and so there is little concern that the engagement of the connect portion 41 will be adversely affected.

In the third embodiment mentioned above, the shape of the engaging member or support ring 39 is annular, but the engaging member is not limited to this construction. For example, a U shaped engaging member could be employed to achieve a similar result.

Additional advantages and desirable attributes associated with this embodiment of the present invention are similar to those described above in connection with the other embodiments.

Figure 7:
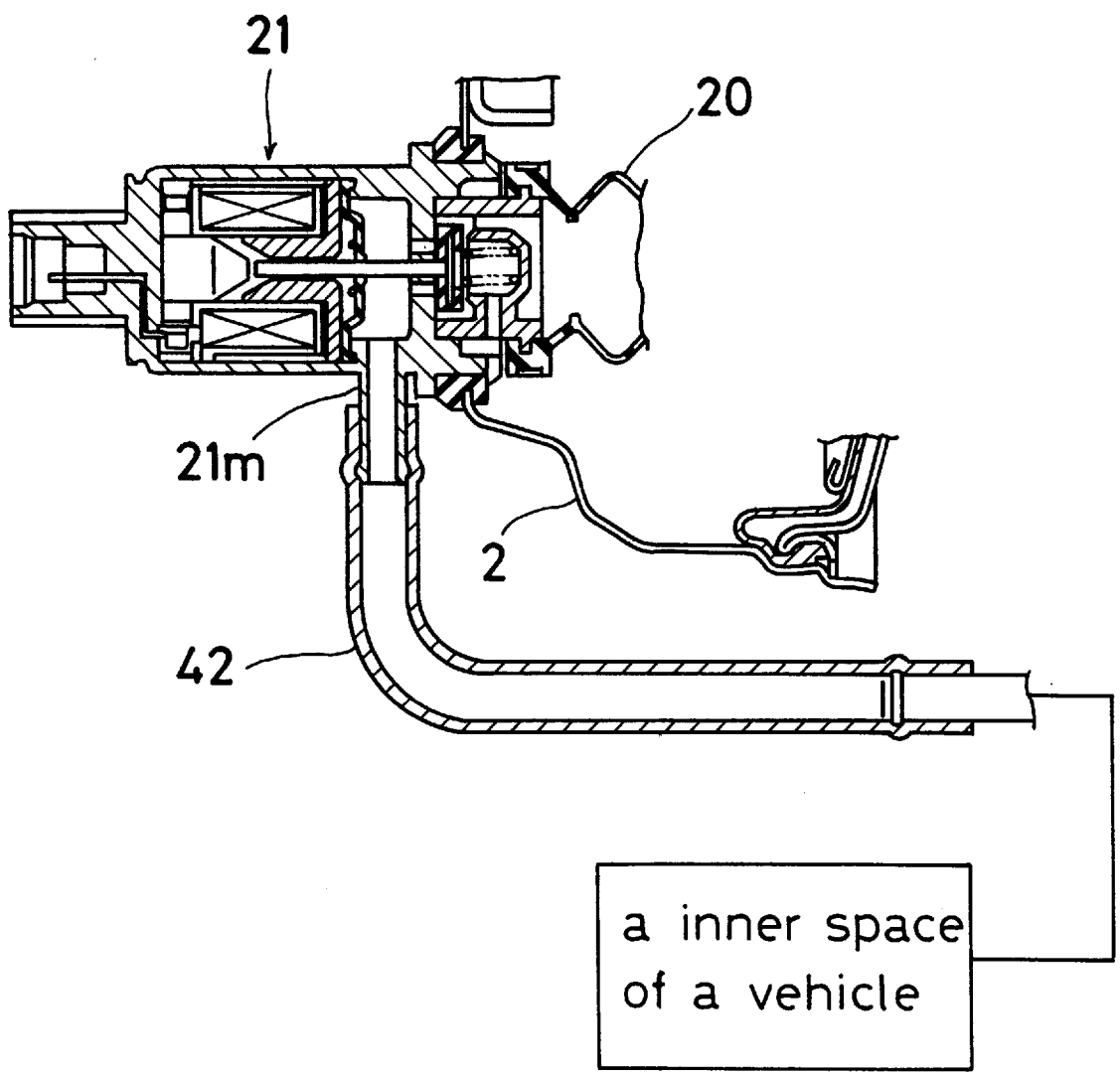
FIG. 7 is a cross-sectional view of a vacuum servo unit according to a fourth embodiment of the present invention.

FIG. 7 illustrates a fourth embodiment of the present invention in which features similar to those discussed above in connection with the other embodiments are identified by the same reference numerals. The following description focuses primarily on the differences with respect to the first embodiment described above.

In FIG. 7, the change member in the form of a solenoid valve 21 is adapted to be mounted in an air tight manner primarily outside the housing and at the front side of the housing 2. The solenoid valve 21 has an integrally formed inhalation port 21m extending outwardly therefrom through which flows atmospheric air introduced to the atmosphere introduction passage 20 and the atmosphere introduction chamber by way of the solenoid valve 21. A connecting member in the form of a pipe 42 communicates the inhalation port 21m with the inner space 84 of the vehicle. One end of the pipe 42 is connected to the inhalation port 21m while the opposite end is connected to the vehicle inner space 84.

Since the inhalation port 21m communicates with the pipe 42, the atmospheric air in the inside space 84 of the vehicle is introduced to the atmosphere introduction chamber through the pipe 42, the inhalation port 21m, the solenoid valve 21, and the atmosphere introduction passage 20 during operation of the solenoid valve 21. Thus, there is little concern that dust, water and other undesirable contaminants will enter the vacuum servo unit because the atmospheric air in the inside space 84 of the vehicle is typically clean. Other features and advantages associated with the vacuum servo unit are similar to those described above in connection with other embodiments.

Figure 8:
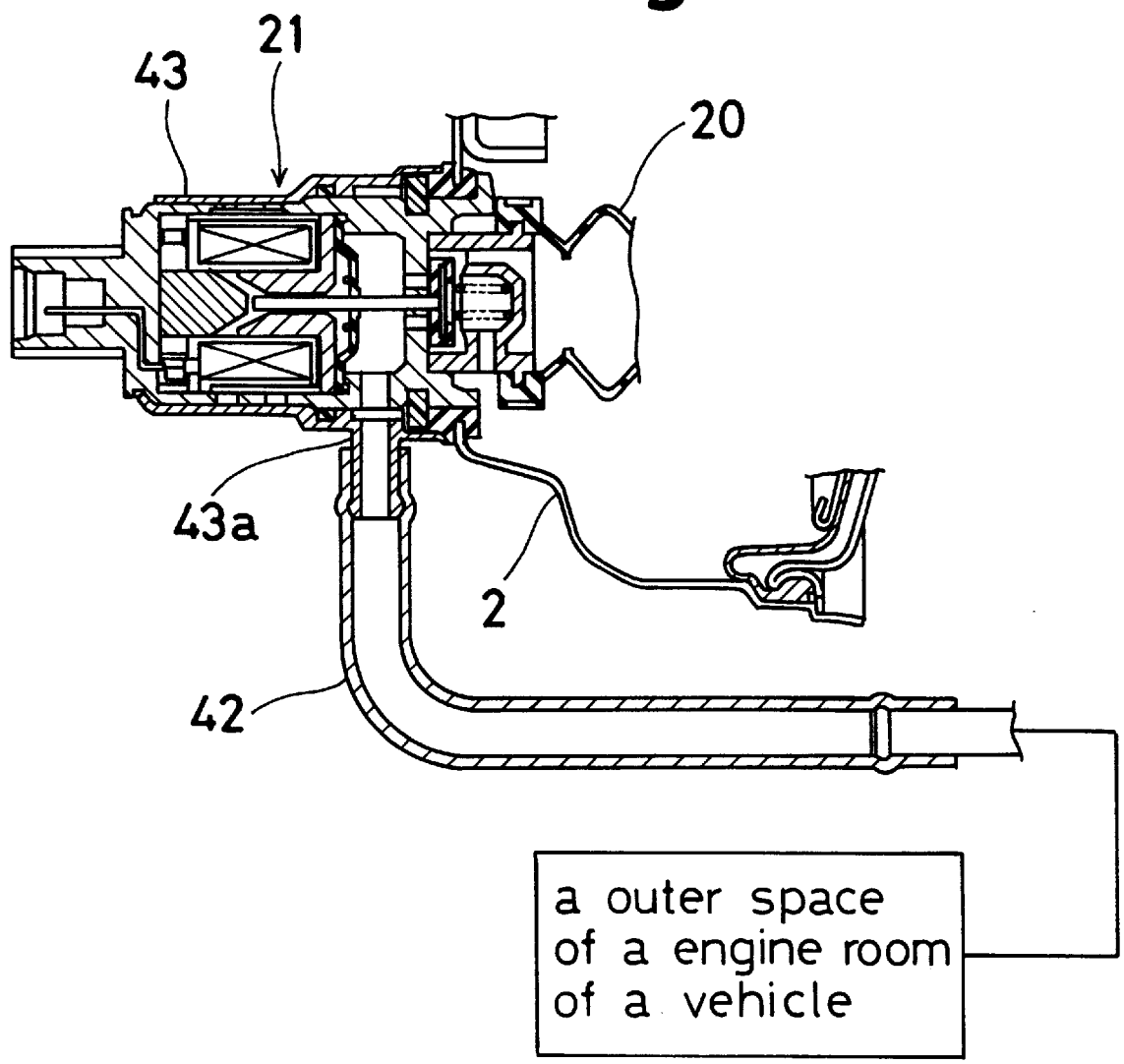
FIG. 8 is a cross-sectional view of a vacuum servo unit according to a fifth embodiment of the present invention.

FIG. 8 illustrates a fifth embodiment of the present invention. Features of this embodiment that are similar to those discussed above in connection with the other four embodiments are identified by the same reference numerals. The following description focuses primarily on the differences of this embodiment relative to the first embodiment.

In the embodiment shown in FIG. 8, the change member in the form of a solenoid valve 21 is installed at the front inside of the housing 2 so that the solenoid valve 21 is mounted in an air tight manner at the front side of the housing 2.

The solenoid valve 21 has a cover 43 that is disposed in an air tight manner with respect to the solenoid valve 21. The solenoid valve 21 is similar to that described above in connection with the embodiment shown in FIG. 3 in that the solenoid includes a valve body portion and a solenoid portion, with a support ring being provided to assist in preventing the solenoid valve 21 from coming off the housing 2. The cover 43 is designed to cover the connection between the valve body portion and the solenoid portion, and the support ring.

The cover 43 is provided with an integrally formed inhalation port 43a extending outwardly therefrom through which flows atmospheric air flowing into the atmosphere introduction passage 20 and the atmosphere introduction chamber by way of the solenoid valve 21.

One end of a pipe 42 is connected to the inhalation port 43a so that the pipe 42 is in communication with the inhalation port 43a. The other end of the pipe 42 is connected to the outer space of the engine room of the vehicle.

Other features and advantages associated with the vacuum servo unit are similar to those described above in connection with the other embodiments.

Figure 9:
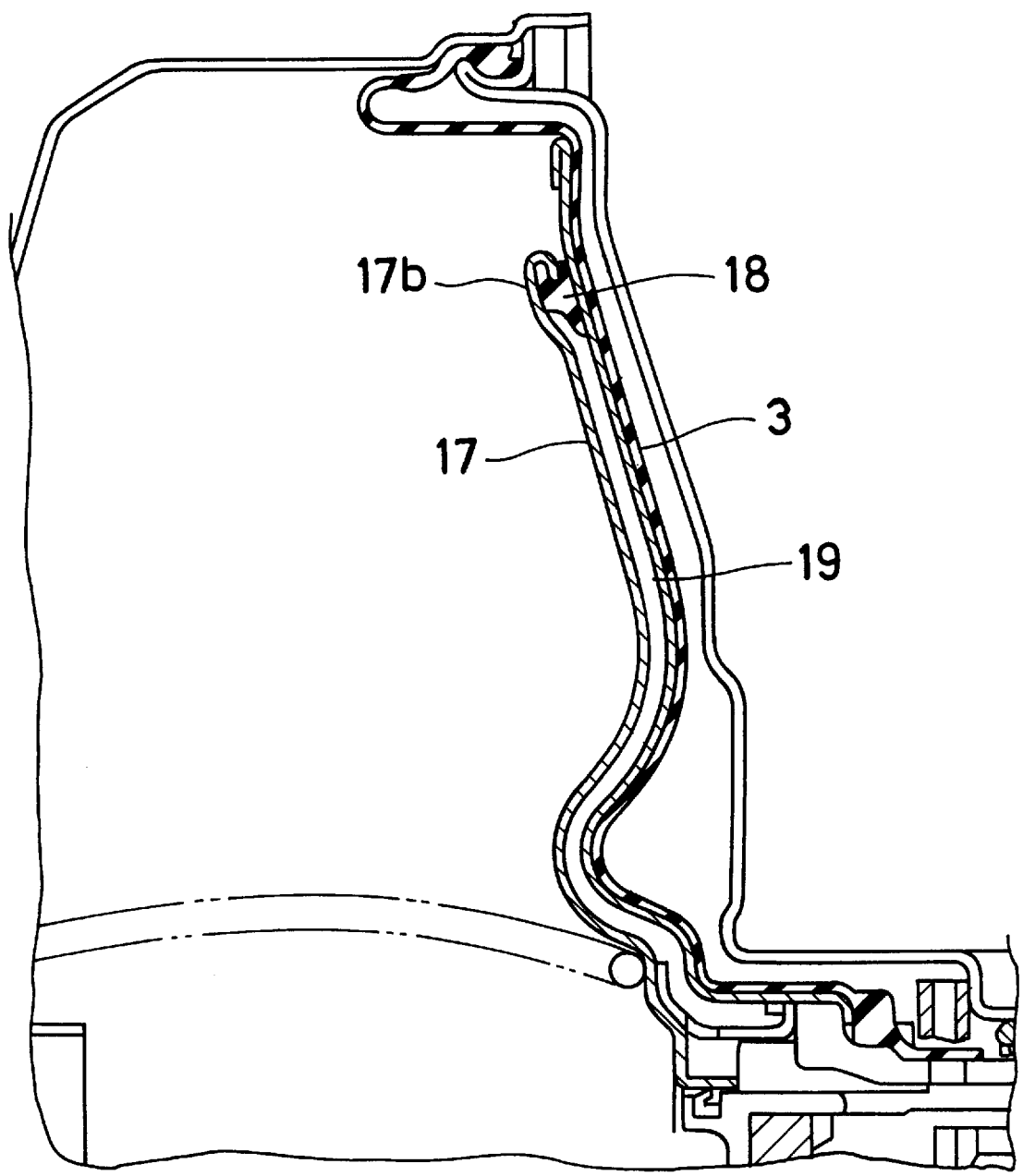
FIG. 9 is a partly enlarged cross-sectional view of a portion of the vacuum servo unit according to a sixth embodiment of the present invention.

FIG. 9 illustrates a sixth embodiment of the present invention. Features of this embodiment that are similar to those discussed above in connection with the other embodiments are identified by the same reference numerals. The following description focuses primarily on the differences of this embodiment relative to the other embodiments.

In FIG. 9, the outer peripheral portion 17a of the partition member 17 is in air tight engagement with the movable wall member 3 through the first seal member 18. The seal member 18 is pressed at its outer peripheral portion by the outer peripheral portion 17b of the partition member 17 to be fixed.

When atmospheric air is introduced into the atmosphere introduction chamber 19, the inside pressure of the atmosphere introduction chamber 19 actuates or urges the first seal member 18 so that the seal member 18 is biased or acted upon by a force in the direction of the outer peripheral portion of the partition member 17, i.e., in the direction that connects the seal member 18 to the movable wall member 3. Thus, the connection between the outer peripheral portion 17b of the partition member 17 and the seal member 18 is improved. That is, the air-tightness that is achieved by the pressing force between the outer peripheral portion 17b of the partition member 17 and the seal member 18 is improved. Likewise, the air-tightness between the seal member 18 and the movable wall member 3 is improved. The stability of the outer peripheral portion 17b of the partition member 17 is also ensured.

Since the portion of the seal member 18 extending towards the inner peripheral portion of the movable wall member 3 from the engaging portion between the seal member 18 and the outer peripheral portion 17b of the partition member 17 sticks to the movable wall member 3 along the movable wall member 3, the maintenance of an air tight seal between the seal member 18 and the movable wall member 3 is easily and reliably achieved.

Further, because the seal member 18 is pressed at its outer peripheral portion by the outer peripheral portion 17a of the partition member 17, it is possible that not only the partition member 17 and the seal member 18 but also that the partition member 17 and the movable wall member 3 engage in a compact composition that maintains a high degree of airtightness. The degree of the freedom in assembling the atmosphere introduction passage to the partition member 17 is improved, and it is possible to make the vacuum servo unit compact in the perpendicular direction of the vacuum servo unit. Other features and advantages associated with the vacuum servo unit are similar to those described above in connection with the other embodiments.

Figure 10:
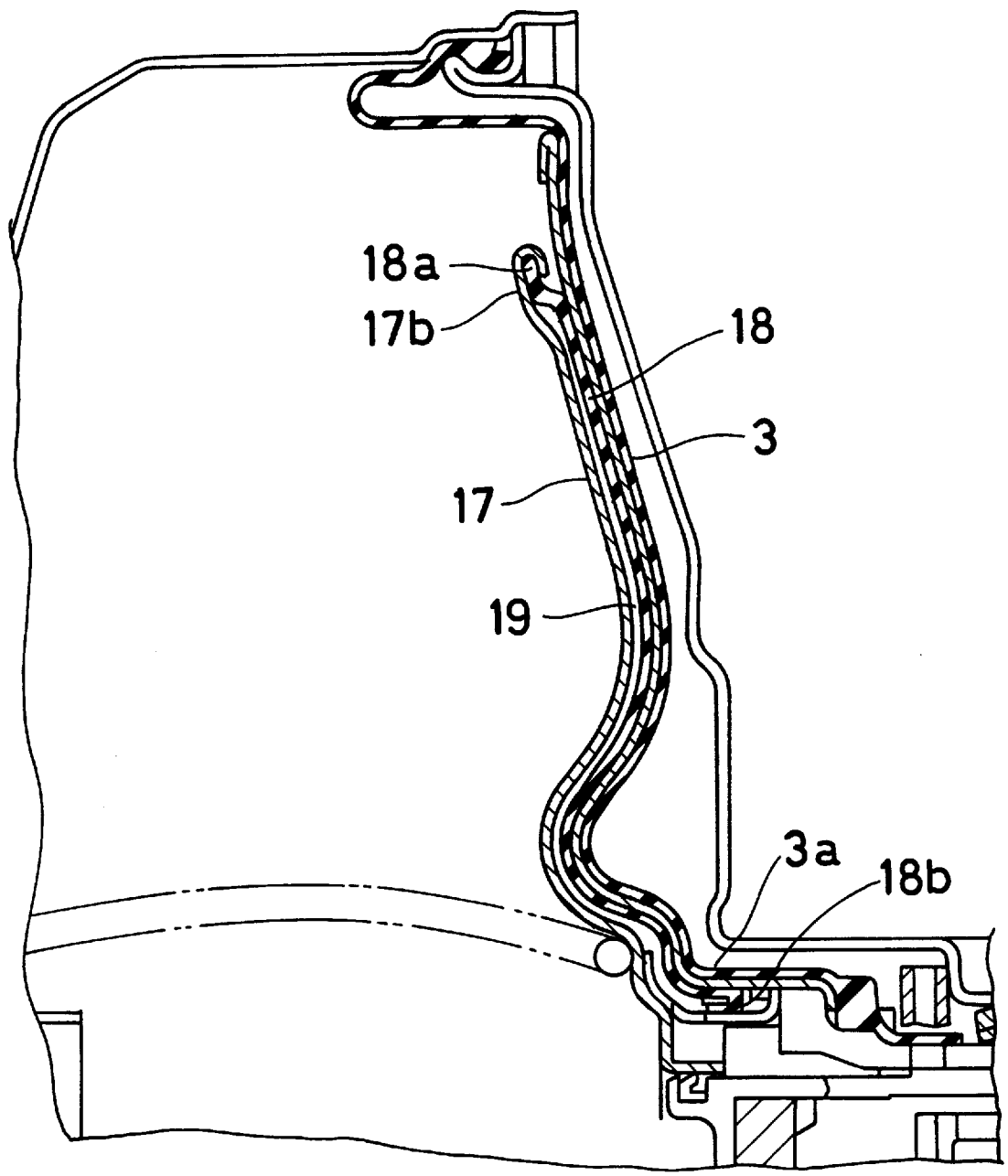
FIG. 10 is a partly enlarged cross-sectional view of a portion of the vacuum servo unit according to a seventh embodiment of the present invention.

FIG. 10 illustrates a seventh embodiment of the present invention in which features similar to those discussed above in connection with the other embodiments are identified by the same reference numerals. The following description focuses primarily on the differences of this embodiment relative to the other embodiments described above.

In the embodiment shown in FIG. 10, the outer peripheral portion 17a of the partition member 17 is once again engaged in an air tight manner with the movable wall member 3 through the first seal member 18. The outer peripheral portion 18a of the seal member 18 is pressed by the outer peripheral portion 17b of the partition member 17 to be fixed. In addition, the inner peripheral portion 18b of the seal member 18 is engaged in an air tight manner with the inner peripheral portion 3a of the movable wall member 3.

When atmospheric air is introduced into the atmosphere introduction chamber 19, the inside pressure of the atmosphere introduction chamber 19 actuates or applies a force to the seal member 18 to bias or press the seal member 18 in the direction of the outer peripheral portion of the partition member 17, i.e., in the direction of connection of the seal member 18 with the movable wall member 3. Thus, the connection between the outer peripheral portion 17b of the partition member 17 and the seal member 18 is improved. That is, the air-tightness of the pressed engagement between the outer peripheral portion 17b of the partition member 17 and the seal member 18 is improved, as is the air-tightness between the seal member 18 and the movable wall member 3. The maintained stability of the outer peripheral portion 17b of the partition member 17 is ensured and the maintenance of a reliable air-tight engagement with the movable wall member 3 is also ensured.

Since the portion of the first seal member 18 extending towards the inner peripheral portion of the movable wall member 3 from the point of engagement between the seal member 18 and the outer peripheral portion 17b of the partition member 17 sticks to or is forced against the movable wall member 3 along the movable wall member 3, the maintenance of the air-tightness between the seal member 18 and the movable wall member 3 is easily achieved.

Other features and advantages associated with this embodiment of the vacuum servo unit are similar to those described above in connection with other embodiments.

Figure 11:
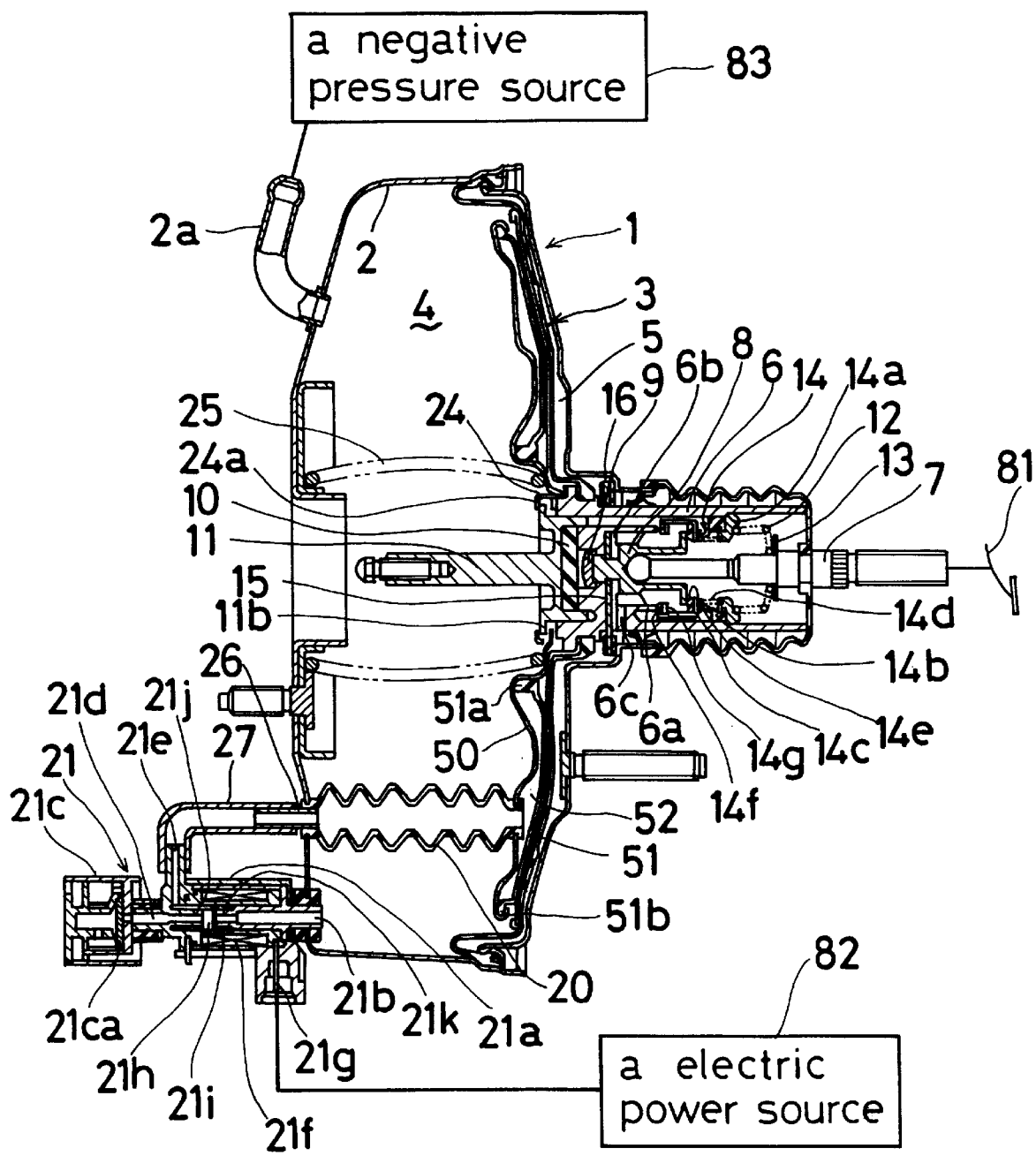
FIG. 11 is a cross-sectional view of a vacuum servo unit according to an eighth embodiment of the present invention.

FIG. 11 illustrates a vacuum servo unit according to an eighth embodiment of the present invention. Features of this embodiment that are similar to those discussed above in connection with the other embodiments are identified by the same reference numerals.

As seen in FIG. 11 the automatically operable vacuum servo unit 1 has a housing 2 that defines a pressure chamber. The outer peripheral portion of a movable wall member 3 is fixed in an air tight manner to the inside of the housing 2 and is movable in the axial direction. The pressure chamber in the housing 2 is divided in an air tight manner into a constant negative pressure chamber 4 and a variable pressure chamber 5 by way of the movable wall member 3. The constant pressure chamber 4 is adapted to communicate with a negative pressure source 83, such as an intake manifold of an internal combustion engine, through an inlet 2a. The constant pressure chamber is constantly under negative pressure.

A movable power piston 6 made of a resin is disposed in the housing 2 and extends from the rear portion of the housing 2. The inner peripheral portion of the movable wall member 3 is connected in an air tight manner with the power piston 6.

An input rod 7 whose right end portion in FIG. 11 is connected with a brake operation member 81 (e.g., brake pedal) is disposed in the power piston 6. The input rod 7 is connected with a first input member 8 so that the two are capable of moving together as a unitary body.

A second input member 9 is disposed in the power piston and contacts the first input member 8. The first input member 8 and the second input member 9 assist in transmitting the brake operation force received from input rod 7 to a reaction disc 10. An output rod 11 which contacts the reaction disc 10 moves by receiving the brake operation force through the reaction disc 10 to operate a master cylinder piston (not specifically shown). A stopper 24 is provided in the power piston 6 and has an engaging portion 24a for limiting the movement towards the left in FIG. 11 of the output rod 11 against the movable power piston 6.

A spring retainer 13 that receives a return spring 12 is fixed in the input rod 7. A first retainer 14a that forms a control member in the form of a valve member 14 is fixed in the power piston 6 and receives the resilience from the input rod 7 through the spring retainer 13 and the return spring 12. The inner peripheral portion of the right end portion of a seal member 14b engages the first retainer 14a, the outer peripheral portion of the right end portion of the seal member 14b functions as a seal with the inner peripheral surface of the power piston 6, and the left end portion of the seal member 14b is glued to the second retainer 14c. A valve spring 14d is provided between the input rod 7 and the second retainer 14c. A valve plate 14g is fixed in the second spring retainer 14c, and an air valve member 14e and a vacuum valve member 14f are fixed respectively to the second spring retainer 14c and the valve plate 14g so as to be formed integrally.

By virtue of the aforementioned construction, the air valve portion 14e engages the first input member 8 in the non-operation state of the input rod 7. In the operation state of the input rod 7, the vacuum valve portion 14f engages the valve seat 6a formed on the power piston 6. A key member 15 is located in a key groove 6b in the power piston 6. The key member 15 is adapted to contact the housing 2 through a damper member 16. Moreover, the power piston 6 has a connect path 6c so that the constant pressure chamber 4 communicates with the variable pressure chamber 5 in the condition that the vacuum valve portion 14f is out of engagement with the valve seat 6a of the power piston 6.

A supplementary movable wall member 50 is positioned in the constant pressure chamber 4. The inner peripheral portion of the supplementary movable wall member 50 is adapted to be placed in air tight engagement with the flange portion 11b of the output rod 11. The supplementary movable wall member 50 is in air tight engagement with a seal member in the form of a diaphragm member 51. The diaphragm member 51 has a bead portion 51a at its inner peripheral portion and also has a bead portion 51b at its outer peripheral portion. The bead portion 51a is engaged with the supplementary movable wall member 51 so that the supplementary movable wall member 51 can slide on the bead portion 51a. Thus, a supplementary variable pressure chamber 52 is formed between the supplementary movable wall member 50 and the diaphragm member 51. The supplementary movable wall member 50 receives a biasing force from a spring 25 that extends between the front wall of the housing 2 and the supplementary movable wall member 50.

The supplementary movable wall member 50 is connected to one end of an atmosphere introduction passage 20 so that the supplementary variable pressure chamber 52 is in communication with the atmosphere introduction passage 20. The opposite end of the atmosphere introduction passage 20 is in air tight engagement with the front face of the housing 2. The atmosphere introduction passage 20 extends through the constant pressure chamber 4 and communicates with a solenoid valve 21 through an air tube 26 and an air hose 27.

The solenoid valve 21 has a valve housing 21a in which are provided a constant pressure port 21b that communicates with the constant pressure chamber 4, an atmosphere port 21d that communicates with a cleaner 21c including the cleaner member 21ca, and a variable pressure port 21e that communicates with the air hose 27. The solenoid 21f is connected with an electric power source 82 of the vehicle by a terminal 21g and a cord (not specifically shown) and is supplied with electric power from the electric power source 82 through operation of a controller (not specifically shown).

A plunger 21h is provided in the solenoid 21f and is biased towards the left side in FIG. 11 by a spring 21i to contact an atmosphere valve 21j. In this condition, because the plunger 21h is out of engagement with a constant pressure valve 21k, the supplementary variable pressure chamber 52 communicates with the constant pressure chamber 4 through the atmosphere introduction passage 20, the air tube 26, the air hose 27, the variable pressure port 21e, and the constant pressure port 21b.

When the solenoid 21f is supplied with electric power from the electric power source 82 through operation of the controller, the solenoid 21f biases the plunger 21h towards the right in FIG. 11, so that the plunger 21h engages the constant pressure valve seat 21k while the plunger 21h moves out of engagement with the atmosphere pressure port 21h. Therefore, atmospheric air is introduced into the supplementary variable pressure chamber 52 through the atmosphere introduction passage 20, the air tube 26, the air hose 27, the variable pressure port 21e, the atmosphere pressure port 21d, and the air cleaner 21c.

The operation of the vacuum servo unit 1 is as follows. In the situation where the brake operation member 81 is not operated by the driver, i.e., in the state shown in FIG. 11, the air valve portion 14e of the valve member 14 is in engagement with the first input member 8, and the vacuum valve portion 14f is out of engagement with the valve seat 6a of the power piston 6. Thus, the variable pressure chamber 5 is in communication with the vacuum power source 83 (e.g., the intake manifold of the internal combustion engine) through the constant pressure chamber 4.

When the brake operation member 81 of the vehicle (e.g., the brake pedal) is actuated by the driver, the input rod 7 connected with the brake operation member 81 receives the brake operation force to move towards the left as seen in FIG. 11. The first input member 8 fixed to the input rod 7 moves integrally with the input rod 7 towards the left in FIG. 11.

The air valve portion 14e and the vacuum valve portion 14f also are moved towards the left with the first input member 8, according to the movement of the first input member 8, by the biasing force of the valve spring 14d. The vacuum valve portion 14f then contacts the valve seat 6a of the power piston 6, which cuts off the communication between the variable pressure chamber 5 and the constant pressure chamber 4. Therefore, communication between the variable pressure chamber 5 and the vacuum source 83 is cut off.

The first input member 8 moves further towards the left in FIG. 11 and the air valve portion 14e moves out of engagement with the first input member 8. Thus, the variable pressure chamber 5 communicates with the atmosphere. This causes a pressure differential to be generated between the constant pressure chamber 4 and the variable pressure chamber 5 by the inflow of atmospheric air into the variable pressure chamber 5. The movable wall 3 receives the load force created by the pressure differential and the power piston 6 connected with the movable wall 3 applies the amplified brake force to the output rod 11 through the reaction disc 10. After this, either the air valve portion 14e and the first input member 8 or the vacuum valve portion 14f and the valve seat 6a are in the engagement state by the reaction force that the input rod 7 receives through the second input member 9 and the first input member 8. The servo force of the vacuum servo unit 1 is controlled according to the driver's brake operation force applied to the input rod 7.

The reaction force according to the brake force generated by the power piston 6 and the brake operation force generated by the operation of the brake pedal 81 and transmitted to the second input member 9 are applied to both sides of the reaction disc 10 respectively, and the reaction force and the brake operation force are balanced.

Figure 12:
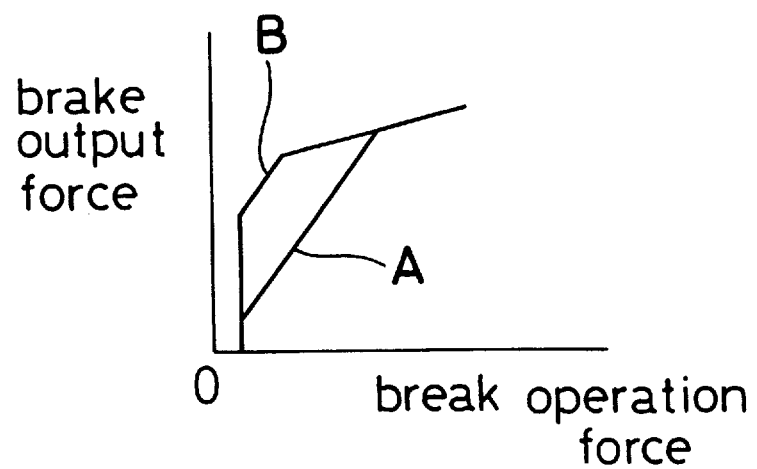
FIG. 12 is a graph showing the performance of a vacuum servo unit according to an embodiment of the present invention.

In this condition, since the solenoid 21f is in the non-operating condition, the supplementary variable pressure chamber 52 communicates with the constant pressure chamber 4. There is no pressure differential in front of and behind the supplementary movable wall member 50. Thus, the pressure in the supplementary variable pressure chamber 52 equals the pressure in the constant pressure chamber 4, and the supplementary movable wall 50 is in the non-operation state. At this time, the relationship between the brake operation force actuated by the input rod 7 and the brake output force actuated by the output rod 11 is represented by the line "A" in FIG. 12.

When an urgent brake operation is needed, such as when the micro computer (not specifically shown) detects that the brake pedal has been operated faster than the preset value of the pedal stroke speed according to the pedal stroke value detected by the pedal stroke switch (not specifically shown) associated with the brake pedal, the solenoid 21f is supplied with electric power from the electric power source 82 independent of the brake operation by the driver. The solenoid 21f supplied with electric power generates electromagnetic power to make the plunger 21h move towards the right in FIG. 11 against the biasing force of the spring 21i.

As described above, atmospheric air is introduced to the supplementary variable pressure chamber 52 according to the movement of the plunger 21h and so a pressure differential is generated in front of and behind the supplementary movable wall member 50. As a result, the supplementary movable wall member 50 moves towards the left in FIG. 11 while sliding on the inner peripheral portion of the bead portion 51a. The supplementary movable wall member 50 moves into engagement with the flange portion 11b of the output rod 11 and supplies the output rod 11 with a load force, thereby producing a brake force.

When atmospheric air is introduced to the supplementary variable pressure chamber 52, the brake output force actuating the output rod 11 in response to the brake operation force supplied to the input rod 7 is increased by a preset value. At this time, the relationship between the brake operation force actuated by the input rod 7 and the brake output force actuated by the output rod 11 is depicted by the line "B" in FIG. 12.

When the driver judges that there is no need for the brake operation and the brake operation member 81 is returned, the second input member 9 moves unitarily with the first input member 8 towards the right in FIG. 11 according to the return stroke of the input rod 7. The air valve portion 14e engages the first input member 8 and the vacuum valve portion 14f moves out of engagement with the valve seat 6a of the power piston 6. Consequently, communication between the variable pressure chamber 5 and the atmosphere is cut off, communication between the variable pressure chamber 5 and the constant pressure chamber 4 is established, the degree of aggressive pressure in the variable pressure chamber 5 increases, and the servo force applied to the power piston 6 decreases. Thus, the power piston 6 and the input rod 7 are moved by the reaction force of the master cylinder (not specifically shown), the return spring 25 moves towards the right in FIG. 11, and the return work is finished by the release of the input force.

When the micro computer (not specifically shown) detects the release of the brake operation by the brake switch (not specifically shown) associated with the brake pedal 81, the supply of electric power from the electric power source 82 to the solenoid 23f is stopped. The solenoid 21f does not generate an electromagnetic force and the plunger 21h is returned toward the left in FIG. 11 by the biasing force of the biasing spring 21i. The movement of the plunger 21h towards the left makes the supplementary variable pressure chamber 52 communicate with the constant pressure chamber 4. Therefore, the supplementary movable wall member 50 is returned by the return spring 25, the engagement between the inner peripheral portion of the supplementary movable wall member 50 and the flange portion 11b of the output rod 11 ceases, and the vacuum servo unit 1 returns to the initial state.

As mentioned above, in accordance with the present invention, in the case where the supplementary movable wall member 50 is biased, the brake output force can be advantageously decreased in response to the decrease of the brake operation force by the driver.

Since the atmosphere introduction passage 20 that communicates with the supplementary variable pressure chamber 52 has a relatively small cross section in the radial direction, the servo efficiency of the vacuum servo unit 1 does not decrease.

There is no need for combining the supplementary movable wall member 50 and the diaphragm 51 to effect engagement between the supplementary movable wall member 50 and the inner peripheral portion of the diaphragm 51 because the bead portion 51a is installed with the supplementary movable wall member 50 in order that the supplementary movable wall member 50 can slide on the bead portion 51a. This simplifies the construction.

The supplementary variable pressure chamber 52 represents a small space between the supplementary movable wall member 50 and the movable wall member 3. Nevertheless, a big output force can be achieved by the small amount of atmospheric air introduced by the operation of the solenoid valve 21, and the result is a highly responsive unit. This construction of the unit makes it possible to miniaturize the solenoid valve 21.

As mentioned above, the return operation of the vacuum servo unit can be finished by the decrease in the operation force applied to the input rod 7, and the release operation of the solenoid valve 21 can be effected according to the signal from the brake switch. It is thus possible to make the construction of the system rather simple.

Figure 13:
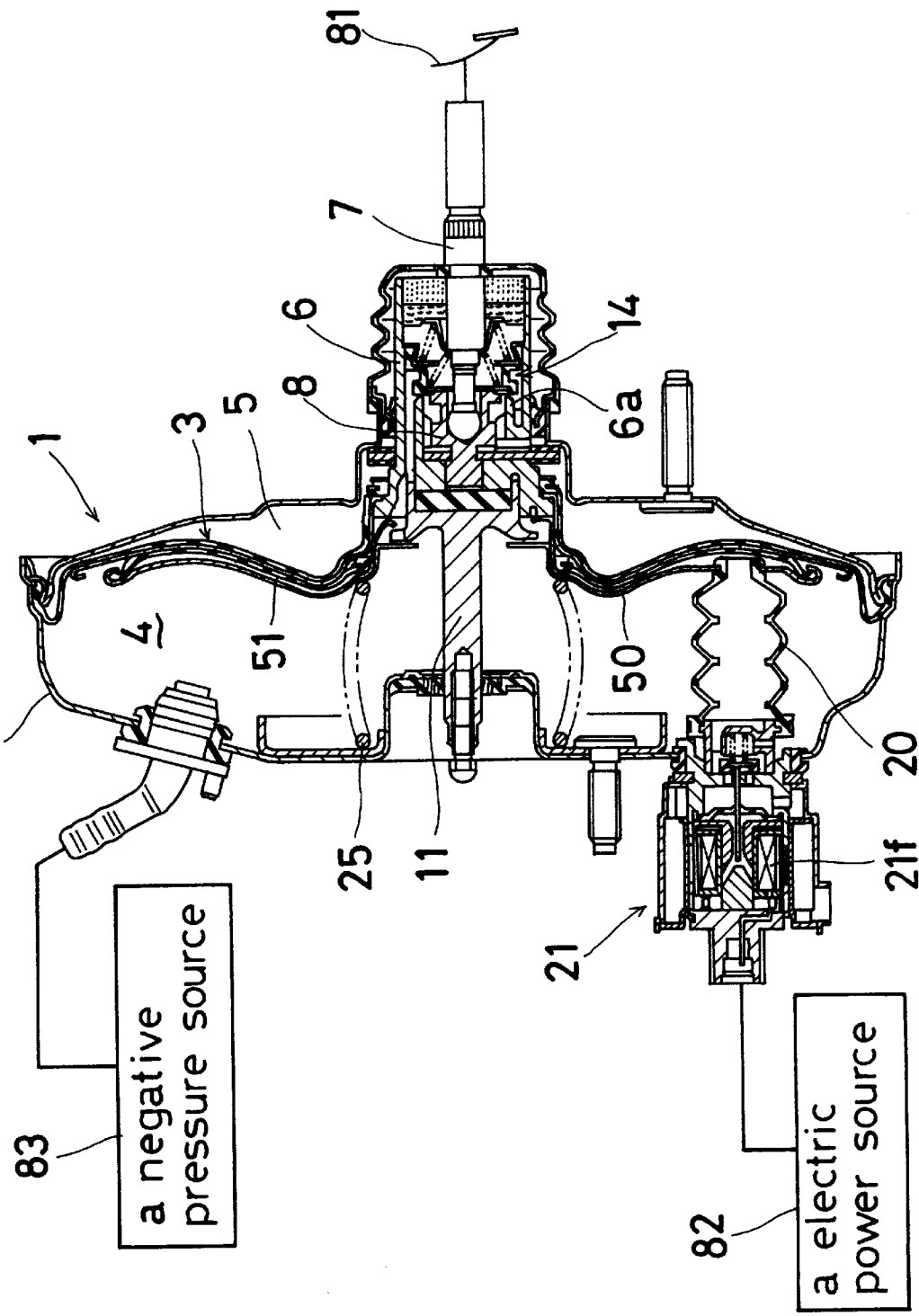
FIG. 13 is a cross-sectional view of a vacuum servo unit according to a ninth embodiment of the present invention.
Figure 14:
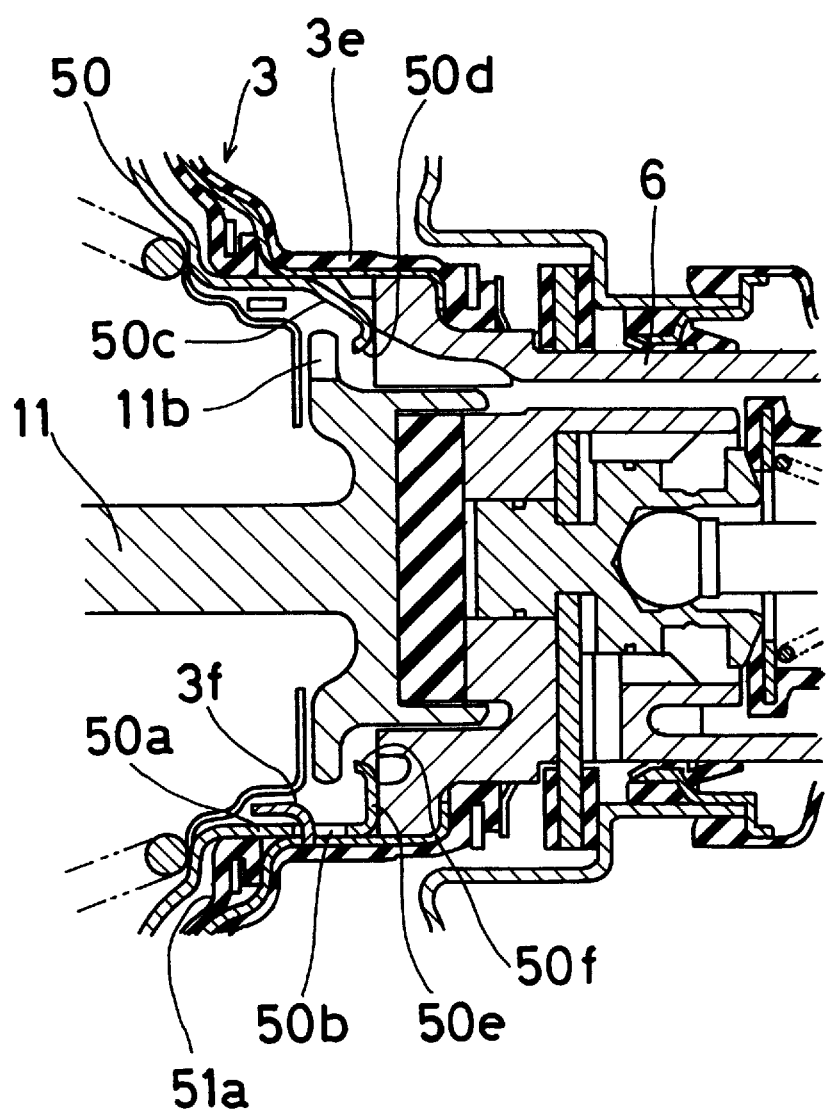
FIG. 14 is a partly enlarged cross-sectional view of a portion of the vacuum servo unit shown in FIG. 13.
Figure 15:
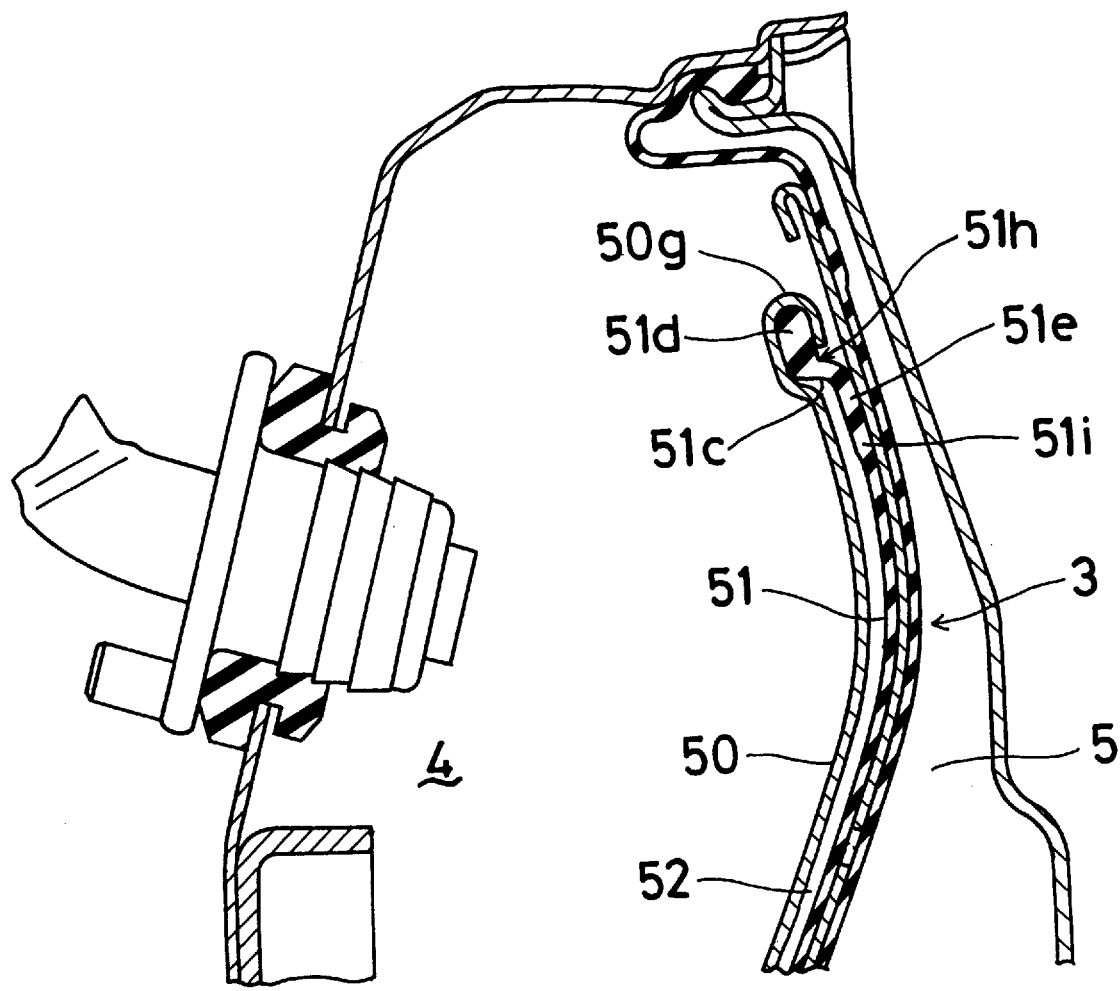
FIG. 15 is a partly enlarged cross-sectional view of a portion of the vacuum servo unit shown in FIG. 13.

FIGS. 13, 14 and 15 illustrate a vacuum servo unit according to a ninth embodiment of the present invention. Features of this embodiment that are similar to those discussed above in connection with the embodiment shown in FIG. 8 are identified by the same reference numerals. The following description focuses primarily on the differences of this embodiment relative to the embodiment illustrated in FIG. 8.

As seen in FIGS. 13 and 14, the inner peripheral end portion of the movable wall member 3 has a cylindrical portion 3e that is coaxially disposed relative to the power piston 6. The cylindrical portion 3e extends towards the input side of the power piston 6, i.e., towards the right in FIG. 14. The inner peripheral end portion of the supplementary movable wall member 50 also has a cylindrical portion 50a that is in coaxial relationship with the power piston 6. The cylindrical portion 50a extends towards the input side of the power piston 6, i.e., towards the right in FIG. 14. The cylindrical portion 50a of the supplementary movable wall member 50 is positioned close to the cylindrical portion 3e of the movable wall member 3 in the radial direction.

A recess portion which can be in the form of a hole 50b is formed on the cylindrical portion 50a. A projecting portion 3f that engages or extends through the hole 50b is formed on the cylindrical portion 3e of the wall member 3. The projecting portion 3f is adapted to move by a preset value in the hole 50b in the axial direction of the power piston 6.

The cylindrical portion 50a of the inner end portion of the supplementary movable wall member 50 has a tapering portion 50c that is disposed at the peripheral portion of the cylindrical portion 50a. The tapering portion is oriented radially inwardly in the direction of the power piston 6.

The inner end portion of the taper portion 50c has a turned portion 50d that turns towards the output side of the power piston 6, i.e., the left in FIG. 14. The turned portion is adapted to contact the flange portion 11b of the output rod 11.

The cylindrical portion 50a of the supplementary movable wall member 50 has a flange portion 50e that projects radially inwardly in the direction of the power piston 6. The inner peripheral end portion of this flange portion 50e has a turned portion 50f that is turned towards the flange portion 11a of the output rod 11 and towards the output side of the power piston 6, i.e., towards the left in FIG. 14.

A first seal member in the form of a bead portion 51a is provided at the inner peripheral portion of the diaphragm 51 so that the supplementary movable wall member 50 can slide on the bead portion 51a.

As seen in FIG. 15, the outer peripheral end portion of the diaphragm 51 comprises a projecting portion 51c that projects in the output direction of the power piston 6, i.e., to the left in FIG. 15. An engaging end portion 51d of the diaphragm 51 extends from the projecting portion 51c. A connecting portion 51h connects the projecting portion 51c and the engaging end portion 51d.

A portion 51e of the diaphragm is thickened as can be seen in FIG. 15. This thickened portion extends from the connect portion 51h to a region 51i, with the length of the thickened portion 51e as measured from the connect portion 51h towards the inner peripheral side of the diaphragm 51 being generally equal to a preset distance by which the supplementary movable wall member 50 moves against the movable wall member 3.

The supplementary movable wall member 50 has a press portion 50g that presses the engaging end portion 51d of the diaphragm 51 from the outer peripheral portion of the diaphragm 51.

The operation of the vacuum servo unit 1 shown in FIGS. 13–15 is the same as that of the vacuum servo unit described above in connection with the eighth embodiment illustrated in FIG. 11.

In the embodiment of the present invention depicted in FIGS. 13–15, when electric power is supplied to the solenoid 21f, atmospheric air is introduced into the supplementary variable pressure chamber 52. Thus, the outer peripheral surface of the cylindrical portion 50a of the supplementary movable wall member 50 is guided by the inner peripheral surface of the cylindrical portion 3e of the movable wall member 3, the outer peripheral surface of the cylindrical portion 50a of the supplementary movable wall member 50 slides on the inner peripheral portion of the bead portion 51a of the diaphragm 51, and the supplementary movable wall member 50 moves towards the left in FIG. 14.

At the inner peripheral side of the supplementary movable wall member 50, the movement of the supplementary movable wall member 50 causes the turned portions 50d, 50f of the supplementary movable wall member 50 to engage the flange portion 11b of the output rod 11 and thereby supply a load force to the output rod 11 towards the left in FIG. 14. The movement of the supplementary movable wall member 50 is limited to a preset value by the contact between the hole 50b of the supplementary movable wall member 50 and the projecting portion 3f of the movable wall member 3.

At the outer peripheral portion of the supplementary movable wall member 50, according to the preset movement of the supplementary movable wall member 50, the outer peripheral engaging end portion 51d, the projecting portion 51c, and the outer peripheral side thickened portion 51e of the diaphragm 51, whose length in the radial direction of the diaphragm S1 corresponds to the preset value length by which the supplementary movable wall member 50 moves against the movable wall member 3, are out of engagement with the movable wall member 3 and are moved towards the left in FIG. 15. According to the movement of the outer peripheral side portion of the diaphragm 51, the engagement end portion 51d, the projecting portion 51c, and the outer peripheral side portion of the diaphragm 51 are biased by the atmospheric air introduced into the supplementary variable pressure chamber 52, and this makes the connection between the engaging end portion 18d and the press portion 50g of the supplementary movable wall member 50. That is, the pressing air tightness is improved. According to the movement of the supplementary movable wall member 50, movement of the outer peripheral side portion of the diaphragm 51 towards the outside in the radial direction of the diaphragm 51 is urged, but this movement is limited because the outer peripheral side portion 51e of the diaphragm 51 is shaped to be thick.

When the supply of electric power to the solenoid 21f is stopped and the supplementary variable pressure chamber 52 communicates with the constant pressure chamber 4, the outer peripheral surface of the cylindrical portion 50a of the supplementary movable wall member 50 is guided by the inner peripheral surface of the cylindrical portion 3e of the movable wall member 3, the outer peripheral surface of the cylindrical portion 50a slides on the inner peripheral portion of the bead portion 51a of the diaphragm 51, and the supplementary movable wall member 50 returns back to the right in FIG. 13 by the urging force of the return spring 25.

In the outer peripheral side of the supplementary movable wall member 50, according to the movement of the supplementary movable wall member 50 towards the initial position, the outer peripheral end portion 51d, the projecting portion 51c, and the outer peripheral side thickened portion 51e of the diaphragm 51 are moved towards the right in FIG. 15 in order to contact the movable wall member 3. When the supplementary movable wall member 50 and the movable wall member 3 move, the thickened portion 51e is not sandwiched between the press portion 50g and the movable wall member 3 because the diaphragm 51 has a thickened portion 51e that does not project towards the outer peripheral side of the diaphragm 51.

As the supplementary movable wall member 50 moreover moves towards the initial position, the engagement between the turned portions 50d, 50f of the supplementary movable wall member 50 and the flange portion 11a of the output rod 11 ceases. Thus, the vacuum servo unit returns to the initial state perfectly.

As mentioned above, since the movable wall member 3 and the supplementary movable wall member 50 have respective cylindrical members 3e, 50a at their respective inner peripheral end portions, the movement of the supplementary movable wall member 50 in the axial direction of the power piston 6 causes the cylindrical portion 50a of the supplementary movable wall member 50 to be guided by the cylindrical member 3e of the movable wall member 3. This prevents the axes of the supplementary movable wall member 50 and the movable wall member 3 from inclining against the axis of the power piston 6. Thus, the supplementary movable wall member 50 and the movable wall member 3 stably move side by side.

The provision of the hole 50b at the inner peripheral end portion of the supplementary movable wall member 50 and the projecting portion 3f at the inner peripheral end portion of the movable wall member 3, and the engagement of the projecting portion 3f with the hole 50b in order to move by the preset value in the hole 50b, causes the movement of the supplementary movable wall member 50 against the movable wall member 3 to be limited to the preset value. In this way, the output rod 11 is prevented from falling out from the power piston 6.

In addition, since the supplementary movable wall member 50 has a cylindrical member 50a at its inner peripheral end portion, a taper portion 50c that is turned radially inwardly in the direction of the power piston 6, and a turning portion 50d on the inner peripheral end portion of the taper portion 50c that turns to the output side of the power piston 6 to contact the output rod 11, the rigidity of the supplementary movable wall member 50 in the axial direction of the power piston 6 is improved. In addition, the stress on the supplementary movable wall member 50 is decreased. Also, the taper portion 50c and the turned portion 50d are biased by the reaction force from the output rod 11 towards the input side of the axial direction of the power piston 6 and so the propulsive power of the supplementary movable wall member 50 is reliably transmitted with the output rod 11.

The engagement of the bead portion 51a with the cylindrical portion 50a of the supplementary movable wall member 50 to allow the cylindrical portion 50a to slide on the inner peripheral portion of the bead portion 51a allows the construction of the vacuum servo unit to be simplified in that a member for connecting the bead portion 51a and the supplementary movable wall member 50 is not needed.

Since the outer peripheral end portion of the diaphragm 51 includes the projecting portion 51c projecting towards the output side of the power piston 6, i.e., towards the left in FIG. 15, the engaging portion 51d extending from the projecting portion 51c, and the thickened portion 51e, the thick portion 51e is not pinched or sandwiched when the supplementary movable wall member 50 returns back to the initial position.

Further, since the engaging end portion 51d of the diaphragm 51 is pressed by the press portion 51g of the supplementary movable wall member 50 so as to be fixed, it is possible for the supplementary movable wall member 50 and the diaphragm 51 to engage each other by a compact structure maintaining the high air tightness. Moreover, the assembly of the atmosphere introduction passage 20 to the supplementary movable wall member 50 is improved, which enables the vacuum servo unit to be miniaturized in the vertical direction against the axial direction of the vacuum servo unit.

In the embodiment described above, the hole 50b that is engaged by the projecting portion 3f of the movable wall can take other forms.

FIG. 16 and FIG. 17 illustrate a tenth embodiment of the present invention in which elements similar to those described in connection with the eighth embodiment and the ninth embodiment are identified with the same reference numerals. The following description focuses primarily on the differences between this embodiment and the ninth embodiment described above.

In FIG. 16 and FIG. 17, the inner peripheral end portion of the movable wall member has a cylindrical member 3e that is disposed in coaxial relationship with the power piston. The cylindrical member 3e extends towards the input side of the power piston. The inner peripheral end portion of the supplementary movable wall member 50 has a cylindrical portion 50a that is disposed in coaxial relationship with the power piston 6. The cylindrical portion 50a extends towards the input side of the power piston and is disposed in close relation to the cylindrical portion 3e of the supplemental movable wall member with respect to the radial direction.

Three recess portions in the form of holes 50b are formed on the flank of the cylindrical portion 50a. Three projecting portions 3f that are adapted to engage respective ones of the holes 50b are formed on the flank of the cylindrical portion 3e. The projecting portions 3f are generally triangular in shape. The projecting portions 3f are configured so as to be able to move by a preset value or amount in the holes 50b in the axial direction of the power piston 6.

By virtue of this construction, particularly the generally triangular shape of the projecting portions 3f, the strength of the projecting portions 3f is improved. It is also possible to improve the working efficiency because the construction of the unit is simplified.

Figure 18:
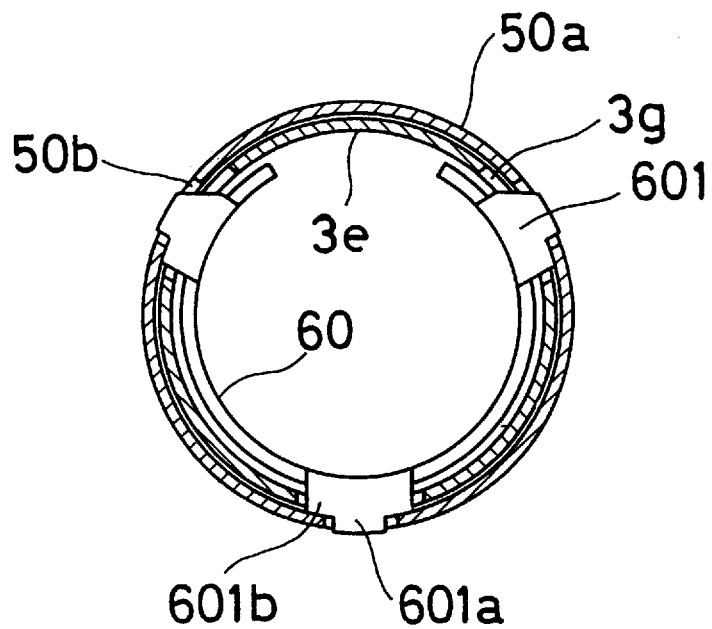
FIG. 18 is a partly enlarged cross-sectional view of a vacuum servo unit according to an eleventh embodiment of the present invention.
Figure 19:
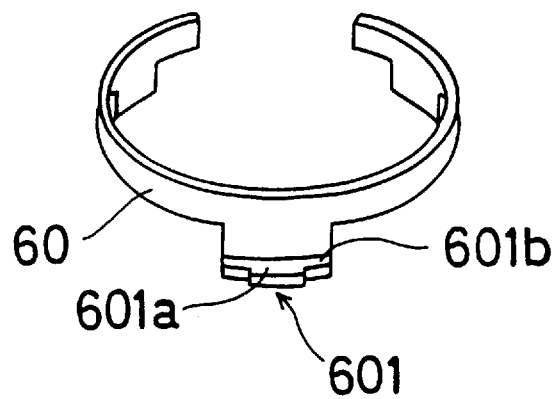
FIG. 19 is a perspective view of a portion of the vacuum servo unit shown in FIG. 18.

Although the projecting portions 3f and the holes 50b are described in terms of being three in number, a different number of projecting portions 3f and holes 50b can be employed FIG. 18 and FIG. 19 illustrate an eleventh embodiment of the present invention. Features of this embodiment that are similar to those discussed above in connection with the embodiments shown in FIGS. 11–17 are identified by the same reference numerals. The following description focuses primarily on the differences of this embodiment relative to the other embodiments.

With reference to FIG. 18 and FIG. 19, the movable wall member has a cylindrical member 3e that is disposed in coaxial relationship with the power piston and extends towards the input side of the power piston at the inner peripheral end portion of the movable wall member. The supplementary movable wall member also has a cylindrical portion 50a that is positioned in coaxial relationship with the power piston, extends towards the input side of the power piston, and is close to the cylindrical portion 3e of the movable wall member in the radial direction of the cylindrical portion 3e at the inner peripheral end portion thereof.

Three recess portions in the form of holes 50b are formed on the flank of the cylindrical portion 50a and three recess portions in the form of holes 3g are formed on the flank of the cylindrical portion 3e.

An engaging member in the form of a ring 60 has three projecting portions 601 that engage the holes 50b of the supplementary movable wall member and the holes 3g of the movable wall member. The projecting portion 601 comprises a first engaging portion 601a which engages one of the holes 50b in the cylindrical portion 50a of the supplementary movable wall member and a second engaging portion 601b which engages one of the holes 3g in the cylindrical portion 3e of the movable wall.

The holes 50b of the cylindrical member 50a and the holes 3g of the cylindrical member 3e are positioned in facing relation to each other, whereupon the ring 60 is inserted into the inside of the cylindrical member 3e. Thus, the projecting portion 601 is elastically engaged with the holes 50b, 3g. That is, the engagement between the projecting portion 601 and the holes 50b, 3g means that the first engaging portion 601a is in engagement with the holes 50b and the second engage portion 601b is in engagement with the holes 3g. The projecting portion 601 and the holes are configured so that the projecting portion 601 is able to move in the holes 50b and the holes 3g by a preset value in the axial direction of the power piston.

This embodiment of the present invention has been described in the context of three projecting portions 601, three holes 50b and three holes 3g respectively, but it is understood that a different number of projecting portions 601 and holes 50b, 3g could be employed. Also, the particular construction and shape of the ring 60 and the engaging projecting portions 601 is not limited to the particular description set forth above and illustration in the drawing figures.

FIG. 20 illustrates a further embodiment of the present invention, in which elements similar to those described in connection with the eighth and ninth embodiments are identified with the same reference numerals. The following description focuses primarily on the differences between this embodiment and the ninth embodiment described above.

The movable wall 3 member as seen in FIG. 20 has a cylindrical member 3e at its inner peripheral end portion. The cylindrical member 3e is disposed in coaxial relationship with the power piston 6 and extends towards the input side of the power piston 6, i.e., towards the right in FIG. 20.

The supplementary movable wall member 50 has a cylindrical portion 50a at its inner peripheral end portion. The cylindrical portion 50a is positioned in coaxial relationship with the power piston 6, extends towards the input side of the power piston 6, i.e., towards the right in FIG. 20, and is close to the cylindrical portion 3e of the movable wall member 3 in the radial direction of the cylindrical portion 3e.

An engaging portion 3h that is adapted to engage the supplementary movable wall member 50 is provided on the outer peripheral portion of the movable wall member 3. A clearance is provided between the engaging portion 3h and the supplementary movable wall 50 for limiting the movement of the supplementary movable wall member 50 against the movable wall member 3 in the axial direction of the power piston 6 by a preset value or amount.

When the solenoid 21f is supplied with electric power, atmospheric air is introduced into the supplementary variable pressure chamber 52. Therefore, the outer surface of the cylindrical portion 50a of the supplementary movable wall member 50 is guided by the inner surface of the cylindrical portion 3e of the movable wall member 3, the outer surface of the cylindrical portion 50a slides on the inner peripheral portion of the bead portion 51a of the diaphragm 51, and the supplementary movable wall member 50 moves towards the left in FIG. 20.

The movement of the supplementary movable wall member 50 towards the left in FIG. 20 is limited by the preset value because the supplementary movable wall member 50 eventually contacts the engaging portion 3h of the movable wall member 3.

In this embodiment of the present invention, it is to be understood that the engaging portion can take a shape different from that shown in FIG. 20.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vacuum servo unit for a vehicle braking system comprising:

a housing in which is defined a pressure chamber;

a movable wall member positioned in said housing for dividing said pressure chamber into a front chamber for communicating with a negative pressure source and a rear chamber for selectively communicating with the atmosphere and with the negative pressure source for being moved in forward and backward directions;

a movable power piston connected with said movable wall member;

an input member positioned in said movable power piston that is movable in forward and backward directions in response to brake actuation;

an output member outputting a propulsion on said movable power piston in response to movement of said movable wall member;

a control member for selectively communicating said rear chamber with said negative pressure source or the atmosphere according to movement of said input member against said movable power piston;

a supplementary movable wall member provided in said front chamber for moving in forward and backward directions and adapted to engage said output member;

a seal member provided between said supplementary movable wall member and said movable wall member, said seal member having an outer peripheral portion in air tight engagement with an outer peripheral portion of said supplementary movable wall member to form a supplementary variable pressure chamber between at least a rear face of said supplementary movable wall member and a front face of said seal member, said supplementary variable pressure chamber being divided in an air-tight manner from said front chamber; and a change member for selectively communicating said supplementary variable pressure chamber with the negative pressure source or with the atmosphere.

2. A vacuum servo unit as claimed in claim 1, including a passage extending through said constant pressure chamber and communicating with said supplementary variable pressure chamber, the change member including a solenoid valve selectively communicating said passage with said constant pressure chamber or with the atmosphere.

3. A vacuum servo unit as claimed in claim 1, wherein said movable wall member has an inner peripheral end portion and said supplementary movable wall member has an inner peripheral end portion, the inner peripheral end portion of said movable wall member and the inner peripheral end portion of said supplementary movable wall member each having cylindrical portions that are disposed in coaxial relationship with said movable power piston.

4. A vacuum servo unit as claimed in claim 1, wherein said supplementary movable wall member has an inner peripheral end portion provided with a cylindrical portion that is disposed in coaxial relationship with said movable power piston, said cylindrical portion extending towards an input side of said movable power piston, said cylindrical portion having a tapered portion that is oriented radially inwardly towards said movable power piston, a inner peripheral end portion of said tapered portion having a turned portion that is turned towards an output side of said movable power piston for contacting said output member.

5. A vacuum servo unit as claimed in claim 1, wherein said supplementary movable wall member has an inner peripheral end portion, said seal member including an inner peripheral portion that is in engagement with the inner peripheral end portion of said supplementary movable wall member to permit said inner peripheral end portion of said supplementary movable wall member to slide on said inner peripheral portion of said seal member during axial movement of the supplementary movable wall member.

6. A vacuum servo unit as claimed in claim 1, wherein said seal member has an outer peripheral portion provided with a projecting portion that projects towards an output side of said movable power piston, and an engaging end portion extending from said projecting portion, said supplementary movable wall member having a press portion that presses said engaging portion of said seal member.

7. A vacuum servo unit as claimed in claim 1, wherein said seal member has an outer peripheral side portion, the seal member having a thickened portion that is thicker than other portions of the seal member, said thickened portion having a length corresponding to a preset distance by which said supplementary movable wall member moves against said movable wall member.

8. A vacuum servo unit as claimed in claim 1, wherein said supplementary movable wall member is engaged with said movable wall member so that movement of said supplementary movable wall member against said movable wall member is limited.

9. A vacuum servo unit as claimed in claim 8, wherein said wall member includes an inner peripheral end portion and said supplementary movable wall member includes an inner peripheral end portion, the inner peripheral end portion of one of said movable wall member and said supplementary movable wall member having a recess portion, and the inner peripheral end portion of the other of said movable wall member and said supplementary movable wall member having a projecting portion that engages said recess portion.

10. A vacuum servo unit as claimed in claim 8, wherein said wall member includes an inner peripheral end portion and said supplementary movable wall member includes an inner peripheral end portion, the inner peripheral end portion of both said movable wall member and said supplementary movable wall member having recess portions, and including an engaging member having projecting portions that engage said recess portions.

11. A vacuum servo unit as claimed in claim 8, wherein said movable wall member has an outer peripheral portion that is provided with an engaging portion for engaging said supplementary movable wall member.

* * * * *